(12) United States Patent
Imajo et al.

(10) Patent No.: US 7,492,433 B2
(45) Date of Patent: Feb. 17, 2009

(54) DISPLAY DEVICE HAVING A BOARD FOR MOUNTING A CONNECTOR FOR INPUTTING OF VIDEO DATA AND A BOARD FOR MOUNTING A DISPLAY CONTROL CIRCUIT AND MANUFACTURING METHOD THEREOF

(75) Inventors: Yoshihiro Imajo, Mobara (JP); Kazuhiko Yanagawa, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 43 days.

(21) Appl. No.: 10/782,926

(22) Filed: Feb. 23, 2004

(65) Prior Publication Data
US 2004/0183984 A1    Sep. 23, 2004

(30) Foreign Application Priority Data
Mar. 20, 2003    (JP)    ............................. 2003-078155

(51) Int. Cl.
*G02F 1/1333*   (2006.01)
*G02F 1/1345*   (2006.01)
*H05K 1/16*     (2006.01)
*G09G 3/36*     (2006.01)

(52) U.S. Cl. .................. 349/149; 349/150; 349/151; 349/152; 349/58; 361/681; 361/686; 345/104

(58) Field of Classification Search .................. 349/58, 349/149–152; 345/104; 361/681, 752, 868; 455/566, 439
See application file for complete search history.

(56) References Cited

U.S. PATENT DOCUMENTS 5,218,760 A * 6/1993 Colton et al. ................. 29/845
5,592,199 A * 1/1997 Kawaguchi et al. ......... 345/206
5,945,984 A * 8/1999 Kuwashiro ................... 345/206
6,025,901 A   2/2000 Adachi et al.
6,266,119 B1 * 7/2001 Takahashi et al. ........... 349/149
6,342,932 B1 * 1/2002 Terao et al. .................... 349/58
6,420,889 B1 * 7/2002 Terada ......................... 324/755
6,424,842 B1 * 7/2002 Winstead ..................... 455/557
6,466,195 B1  10/2002 Hashimoto et al.
6,529,179 B1   3/2003 Hashimoto et al.
6,903,794 B2 * 6/2005 Fukuta et al. ................ 349/150
2001/0040664 A1* 11/2001 Tajima et al. ................ 349/150
2003/0117543 A1* 6/2003 Chang ........................... 349/58

FOREIGN PATENT DOCUMENTS

JP            8-931        8/1985

(Continued)

OTHER PUBLICATIONS

Taiwanese Patent Office Office Action dated Oct. 26, 2007, in Chinese.
JPO Office Action dated Dec. 4, 2007, in Japanese.

*Primary Examiner*—David Nelms
*Assistant Examiner*—Hoan C Nguyen
(74) *Attorney, Agent, or Firm*—Reed Smith LLP; Juan Carlos A. Marquez, Esq.

(57) ABSTRACT

In a display device forming a board for mounting a connector which allows inputting of video data thereon and a board for mounting a display control circuit to be connected to the connector thereon on a surface of a display module opposite to an observation side, the board for mounting the connector thereon and the board for mounting the display control circuit thereon are physically separated from each other and, further, an area of the board for mounting the display control circuit thereon is set smaller than an area of the board for mounting the connector thereon.

6 Claims, 15 Drawing Sheets

FOREIGN PATENT DOCUMENTS

| | | |
|---|---|---|
| JP | 63-148580 | 12/1986 |
| JP | 1-85714 | 11/1987 |
| JP | 3-71570 | 11/1989 |
| JP | 9-54334 | 8/1995 |
| JP | 10-260423 | 3/1997 |
| JP | 11-167369 | 12/1997 |
| JP | 11-218778 | 2/1998 |
| JP | 11-305227 | 4/1998 |
| JP | 2000-172192 | 12/1998 |
| JP | 2000-105543 | 7/1999 |
| JP | 2000-105549 | 7/1999 |
| JP | 2002-305361 | 4/2001 |
| KR | 97-10272 | 1/1994 |
| KR | 2001-0098112 | 4/2000 |

\* cited by examiner

FIG. 17A   FIG. 17B   FIG. 17C
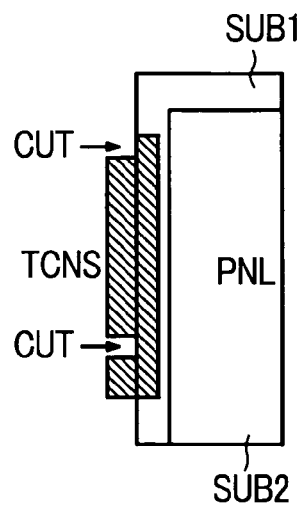 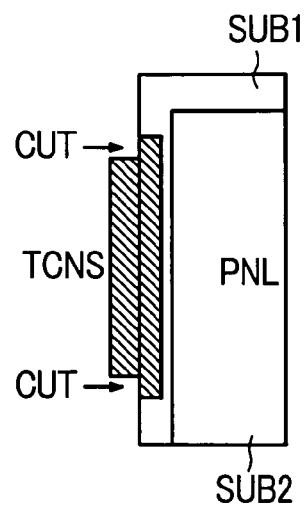 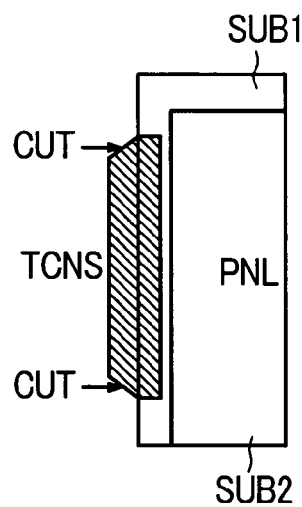
FIG. 18A   FIG. 18B   FIG. 18C
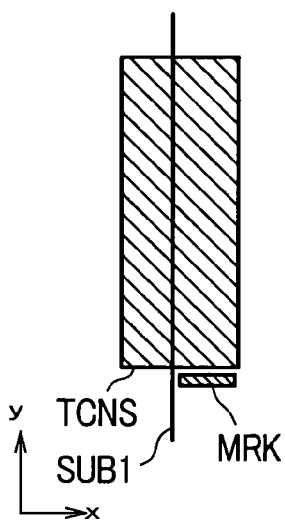 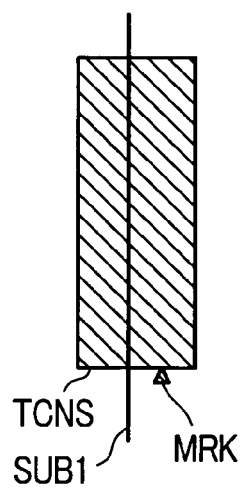 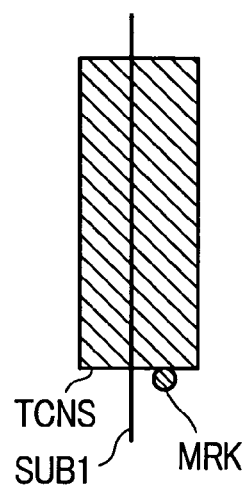

FIG. 19A
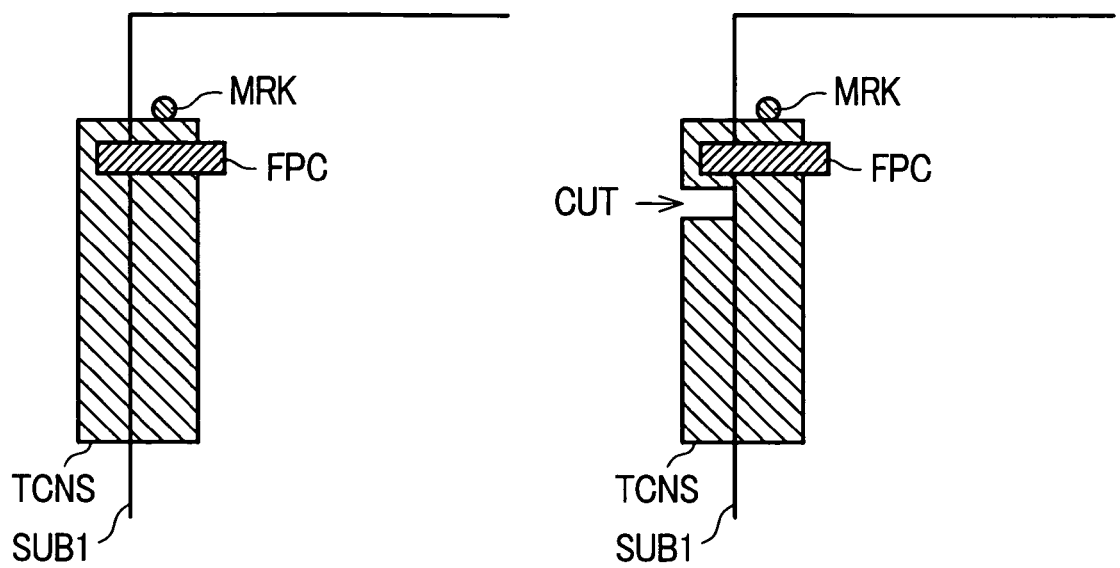
FIG. 19B
FIG. 20
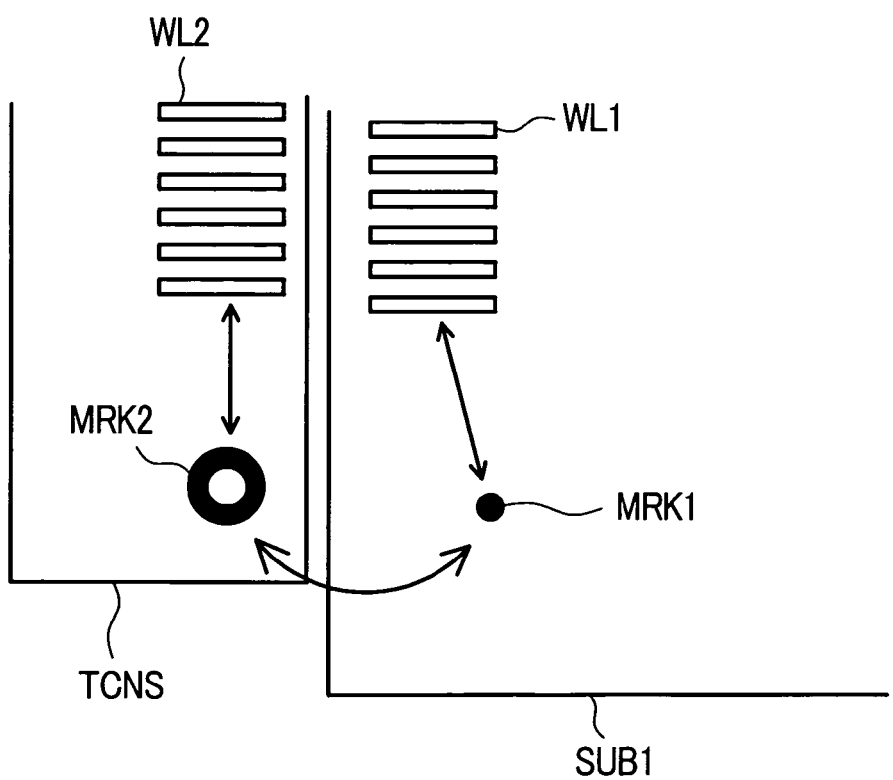

DISPLAY DEVICE HAVING A BOARD FOR MOUNTING A CONNECTOR FOR INPUTTING OF VIDEO DATA AND A BOARD FOR MOUNTING A DISPLAY CONTROL CIRCUIT AND MANUFACTURING METHOD THEREOF

BACKGROUND OF THE INVENTION

1. Field of the Invention

The present invention relates to a display device, and more particularly to a liquid crystal display device, an electroluminescence array or other display device.

2. Description of the Related Art

For example, a liquid crystal display device includes a liquid crystal display panel PNL which, as an example, uses transparent substrates as an envelope and fills liquid crystal therein, a back light which makes light pass through the liquid crystal display panel PNL and a drive circuit which supplies display signals to the inside of the liquid crystal display panel PNL and is formed into a module by housing these components in the inside of a frame.

Further, on a back surface of the liquid crystal display module which is formed into a module in this manner, a display control circuit for controlling the drive circuit is arranged together with a connector which fetches video date from the outside of the liquid crystal display device.

SUMMARY OF THE INVENTION

However, the liquid crystal display device having such a constitution is configured such that the display control circuit and the connector are mounted on the same board and the board is mounted on the frame of the liquid crystal display module.

Accordingly, it has been pointed out that depending on users, it is often the case that the connector does not conform to the specification of the user side and hence, the exchange of the connector is not easy.

Further, in such an exchange, there also arises a drawback that the display control circuit which functions normally has to be exchanged simultaneously.

The present invention has been made under such circumstances and it is an advantage of the present invention to provide a display device which facilitates the exchange of a connector for fetching video date from the outside.

Further, the present invention provides a display device which can achieve the above-mentioned advantage or various advantages which become apparent in the following explanation.

To briefly explain the summary typical inventions among inventions disclosed in this specification, they are as follows.

(1)

A display device according to the present invention, for example, is provided with a board for mounting a connector which allows inputting of video data thereon and a board for mounting a display control circuit to be connected to the connector thereon on a surface of a display module opposite to an observation side, wherein the board for mounting the connector thereon and the board for mounting the display control circuit thereon are physically separated from each other and, at the same time, an area of the board for mounting the display control circuit thereon is set smaller than an area of the board for mounting the connector thereon.

(2)

A display device according to the present invention, for example, includes a display panel PNL, another member different from the display panel PNL which is mounted on a back surface of the display panel PNL, and a board for mounting the connector which allows inputting of video data and a display control circuit which is connected to the connecter, wherein the board for mounting the connector thereon and the board for mounting the display control circuit thereon are physically separated from each other, the board for mounting the display control circuit thereon is arranged to be brought into contact with a back surface of a region of the display panel PNL except for a display region, and the board for mounting the connector is arranged to be brought into contact with a back surface of the another member.

(3)

The display device according to the present invention is, for example, on the premise of the constitution of either means (1) or (2), characterized in that the board for mounting the display control circuit thereon includes a multilayered wiring layer and the number of stacked layers is set larger than the number of stacked layers of the board for mounting the connector.

(4)

The display device according to the present invention is, for example, on the premise of the constitution of either means (2) or (3), characterized in that an area of the board for mounting the display control circuit thereon is set smaller than an area of the board for mounting the connector thereon.

(5)

The display device according to the present invention is, for example, on the premise of the constitution of any one of means (2) to (4), characterized in that signal lines which are formed on the display panel PNL are electrically connected with terminals which are pulled out from the display control circuit on a surface of the board on which the display control circuit is mounted opposite to amounting surface for the display control circuit.

(6)

The display device according to the present invention is, for example, on the premise of the constitution of means (5), characterized in that the surface of the board on which the display control circuit is mounted opposite to the mounting surface for the display control circuit faces a surface of the display panel PNL opposite to a surface on which the signal lines are mounted in an opposed manner, and the signal lines of the display panel PNL and terminals of the board for mounting the display control circuit are electrically connected with each other by way of a flexible printed circuit board having a conductive layer on one side thereof.

(7)

The display device according to the present invention is, for example, on the premise of the constitution of any one of means (2) to (4), characterized in that first terminals which are arranged in parallel to each other are formed on the display panel PNL on a surface opposite to the board for mounting the display control circuit, second terminals which are arranged in parallel to each other are formed on a surface of the board for mounting the display control circuit thereon opposite to the display panel PNL, and the first terminals and the second terminals which correspond to each other are electrically connected with each other by way of respective conductive portions formed in the inside of a clip which is mounted in a state that the clip clamps side surface portions of the boards which mount the display panel PNL and the display control circuit thereon.

(8)

The display device according to the present invention is, for example, on the premise of the constitution of any one of means (2) to (4), characterized in that first terminals which are arranged in parallel to each other are formed on the display panel PNL on a surface opposite to the board for mounting the display control circuit, second terminals which are arranged in parallel to each other are formed on a surface of the board for mounting the display control circuit thereon opposite to the display panel PNL, and the first terminals and the second terminals which correspond to each other are electrically connected with each other by way of a flexible printed circuit board which is arranged at side surface portions of the boards which mount the display panel PNL and the display control circuit thereon.

(9)

The display device according to the present invention is, for example, on the premise of the constitution of any one of means (2) to (4), characterized in that the display control circuit board is arranged along a side on which a scanning signal drive circuit of the display panel PNL is arranged, the board for mounting the connector thereon extends toward another end side while setting a portion thereof which is connected with the display control circuit board as one end thereof, the connector is arranged such that the direction that terminals thereof are arranged is substantially aligned with the extending direction of the connector, and a width of the connector in the direction that the terminals are arranged in parallel is set larger than a width of the connector in the direction which crosses the extending direction of the board.

(10)

The display device according to the present invention is, for example, on the premise of the constitution of any one of means (2) to (4), characterized in that the board for mounting the connector thereon is replaced with a member which pulls out a bundle of cables from the connector and at least fixing of the connector to the display panel PNL is performed using an adhesive tape.

(11)

The display device according to the present invention is, for example, on the premise of the constitution of any one of means (2) to (4), characterized in that a fuse for preventing the generation of an eddy current to the display control circuit board is mounted on the board for mounting the connector thereon.

(12)

The display device according to the present invention is, for example, on the premise of the constitution of any one of means (2) to (4), characterized in that a data storage medium is mounted on the board for mounting the display control circuit thereon.

(13)

The display device according to the present invention is, for example, on the premise of the constitution of any one of means (2) to (4), characterized in that a data storage medium is mounted on the board for mounting the connector thereon.

(14)

The display device according to the present invention is, for example, on the premise of the constitution of any one of means (2) to (4) and (12), characterized in that a first data storage medium is mounted on the board for mounting the connector thereon, a second data storage medium is mounted on the board for mounting the display control circuit thereon, information to be supplied to the outside of the device is set in the first data storage medium, and information to be supplied to the inside is set in the second data storage medium.

(15)

The display device according to the present invention is, for example, on the premise of the constitution of means (12), characterized in that the display device includes a DA converter which generates gray scale voltages based on information stored in the data storage medium.

(16)

The display device according to the present invention is, for example, on the premise of the constitution of means (15), characterized in that the DA converter is incorporated into a video signal drive circuit.

(17)

The display device according to the present invention is, for example, on the premise of the constitution of means (15), characterized in that the DA converter is incorporated into the display control circuit.

(18)

A display device according to the present invention, for example, is provided with boards which mount a connector for allowing inputting of video data and a display control circuit which is connected to the connector thereon, wherein the board for mounting the connector thereon and the board for mounting the display control circuit thereon are physically separated from each other and, further, the board for mounting the display control circuit thereon is arranged on a back surface of a display drive circuit which is mounted on a display panel PNL, the display drive circuit is constituted of a plurality of semiconductor devices, and power source is supplied to the respective semiconductor devices from the board for mounting the display control circuit thereon and, further, the number of power source supply portions and the corresponding number of semiconductor devices are set equal in a state that other semiconductor devices are not interposed in a path from a power source supply portion to the respective semiconductor devices.

(19)

The display device according to the present invention is, for example, on the premise of the constitution of means (18), characterized in that the power source supply portions to the display drive circuit are provided in plural numbers, and the semiconductor devices which are arranged between one power source supply portion and another power source supply portion are provided in plural numbers.

(20)

The display device according to the present invention is, for example, on the premise of the constitution of means (19), characterized in that the number of semiconductor devices arranged between one power source supply portion and another power source supply portion is 2.

(21)

The display device according to the present invention is, for example, on the premise of the constitution of means (19), characterized in that the number of power source supply portions to the display drive circuit is the odd number and one of the power source supply portions is positioned outside one end of the display drive circuit which is constituted of a plurality of semiconductor devices.

(22)

The display device according to the present invention is, for example, on the premise of the constitution of means (21), characterized in that the number of semiconductor devices is 3 and the number of power source supply portions is 2.

(23)

The display device according to the present invention is, for example, on the premise of the constitution of means (21), characterized in that the power source supply portions which are positioned outside one end of the display drive circuit are positioned at a side of the board on which the display drive circuit is formed which extends beyond another board which faces the board on which the display drive circuit is formed in an opposed manner.

(24)

A display device according to the present invention, for example, is provided with boards which mount a connector for allowing inputting of video data and a display control circuit which is connected to the connector thereon, wherein the board for mounting the connector thereon and the board for mounting the display control circuit thereon are physically separated from each other and, further, the board for mounting the display control circuit is arranged such that one side thereof with respect to an imaginary line extending in the longitudinal direction is positioned on a back surface of a display panel and another side with respect to the imaginary line is exposed from the display panel PNL, and notches are formed in a side of the portion of the display control circuit board which is exposed from the display panel PNL, the notches are cut out along the direction orthogonal to the side, and end sides of the notches are aligned with the imaginary line.

(25)

The display device according to the present invention is, for example, on the premise of the constitution of means (24), characterized in that the display device includes a frame which houses the display panel PNL and the board for mounting the display control circuit thereon, and a member which fixes the frame with screws, and distal end portions of the screws which penetrate the frame are positioned in the inside of the notches formed in the display control circuit board.

(26)

The display device according to the present invention is, for example, on the premise of the constitution of means (24), characterized in that the notches are formed in plural numbers.

(27)

A display device according to the present invention, for example, is provided with boards which mount a connector for allowing inputting of video data and a display control circuit which is connected to the connector thereon, wherein the board for mounting the connector thereon and the board for mounting the display control circuit thereon are physically separated from each other and, further, the board for mounting the display control circuit is arranged such that one side thereof with respect to an imaginary line extending in the longitudinal direction is positioned on a back surface of a display panel PNL and another side with respect to the imaginary line is exposed from the display panel PNL, and a mark is formed on a surface of the display panel PNL such that the mark is aligned with a portion of a side of the board for mounting the display control circuit which is positioned on a back surface of the display panel PNL.

(28)

The display device according to the present invention is, for example, on the premise of the constitution of means (27), characterized in that the mark is formed in the vicinity of a flexible printed circuit board which establishes an electrical connection between the board for mounting the display control circuit and the display panel PNL.

(29)

The display device according to the present invention is, for example, on the premise of the constitution of means (28), characterized in that the display control circuit is provided with a positioning notch in the vicinity of the flexible printed circuit board.

(30)

A display device according to the present invention, for example, is provided with boards which mount a connector for allowing inputting of video data and a display control circuit which is connected to the connector thereon, wherein the board for mounting the connector thereon and the board for mounting the display control circuit thereon are physically separated from each other and, the board for mounting the display control circuit is positioned on a back surface of the display panel PNL, a first mark is formed on a region of the display panel PNL which the display control circuit board faces in an opposed manner, and a second mark is formed on a region of the display control circuit board which the display panel faces in an opposed manner, and the first mark and the second mark are constituted as marks for positioning the display control circuit board with respect to the display panel PNL.

(31)

A manufacturing method of a display device according to the present invention, for example, in a display device which includes at least a display panel PNL and a board which mounts a connector for allowing inputting of video data and a display control circuit which is connected to the connector thereon, wherein the board for mounting the connector thereon and the board for mounting the display control circuit are physically separated from each other, the board for mounting the display control circuit is arranged on a back surface of the display panel PNL at a region except for a display part, and the method includes a step in which after the board for mounting the display control circuit is arranged on the back surface of the display panel PNL, an inspection is performed by driving the display device based on the board for mounting the display control circuit thereon.

(32)

A manufacturing method of a display device according to the present invention, for example, in a display device which includes at least a display panel PNL and a boards which mounts a connector for allowing inputting of video data and a display control circuit which is connected to the connector thereon, wherein the board for mounting the connector thereon and the board for mounting the display control circuit thereon are physically separated from each other, the board for mounting the display control circuit is arranged on a back surface of the display panel PNL at a region except for a display part, and the method includes a step in which after the board for mounting the display control circuit is arranged on the back surface of the display panel PNL, an inspection is performed by driving the display device based on the board for mounting the display control circuit thereon, and a step in which the board for mounting the connector thereon is mounted.

(33)

The manufacturing method of a display device according to the present invention is, for example, on the premise of the constitution of means (31) or (32), characterized in that the display device is a notebook type personal computer.

(34)

The manufacturing method of a display device according to the present invention is, for example, on the premise of the constitution of means (31) or (32), characterized in that the display device is a monitor.

(35)

The manufacturing method of a display device according to the present invention is, for example, on the premise of the constitution of means (31) or (32), characterized in that the display device is a television receiver set.

BRIEF DESCRIPTION OF THE DRAWINGS

FIGS. 7A, 7B and 7C are constitutional views showing another embodiment of a display device according to a present invention and also is a view showing a connection mode between the display control circuit board and the connector board or the like;

FIGS. 11A, 11B, 11C, 11D, 11E and 11F are constitutional views showing one embodiment of a connector which is connected to a cable of a flexible printed circuit board or the like;

FIGS. 17A, 17B and 17C are views showing another embodiment of the constitution of the display control circuit board;

FIGS. 18A, 18B and 18C are views showing the constitution for facilitating the alignment of the display control circuit board with respect to the display panel PNL;

FIGS. 19A and 19B are views showing the constitution for facilitating the alignment of the display control circuit board with respect to the display panel PNL;

FIG. 20 is a view showing the constitution for facilitating the alignment of the display control circuit board with respect to the display panel PNL;

DETAILED DESCRIPTION

Embodiments of a display device according to the present invention are explained in conjunction with drawings.

Embodiment 1

<<Overall Equivalent Circuit>>

Figure 22A:
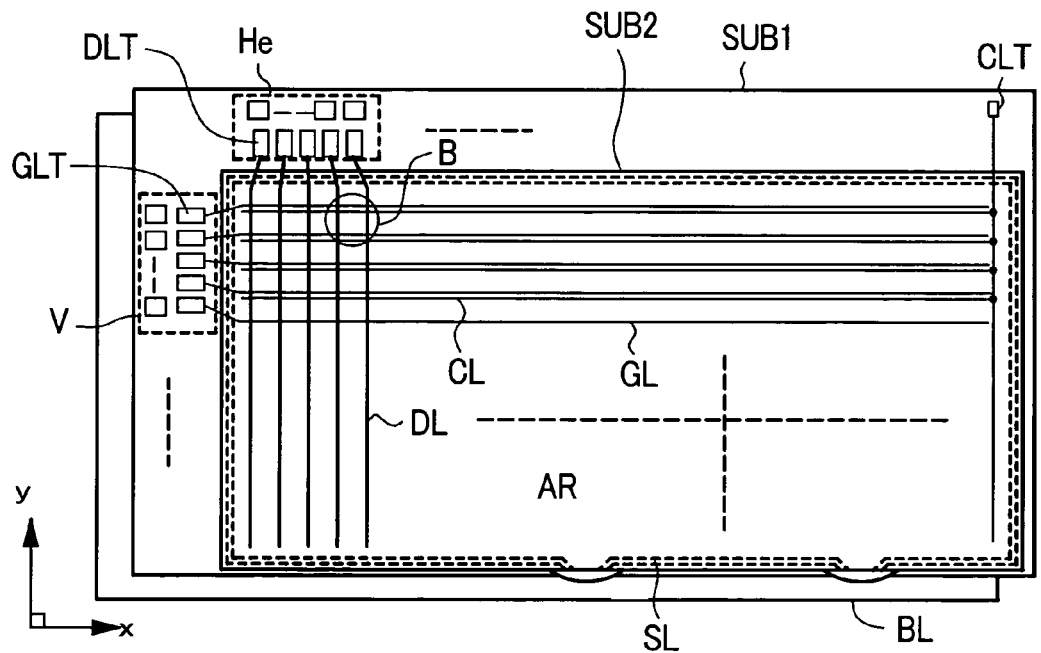
FIGS. 22A and 22B are equivalent circuit diagrams showing one embodiment of the display panel PNL of the display device according to the present invention.
Figure 22B:
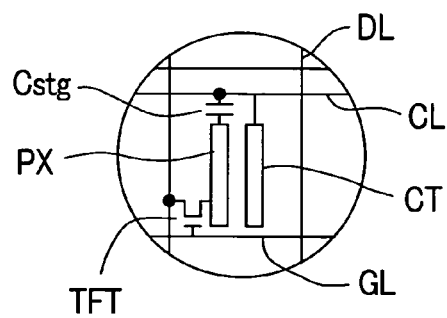

FIG. 22 is an equivalent circuit diagram showing one embodiment of a liquid crystal display device, for example.

In FIG. 22, there are provided a pair of transparent substrates SUB1, SUB2 which are arranged to face each other in an opposed manner with liquid crystal therebetween, wherein the liquid crystal is sealed by a sealing material SL which also performs a function of fixing another transparent substrate SUB2 to one transparent substrate SUB1.

On a liquid-crystal-side surface of one transparent substrate SUB1 which is surrounded by the sealing material SL, gate signal lines GL which extend in the x direction and are arranged in parallel in the y direction and drain signal lines DL which extend in the y direction and are arranged in parallel in the x direction are formed.

Regions which are surrounded by the respective gate signal lines GL and the respective drain signal lines DL constitute pixel regions and a mass of these respective pixel regions in a matrix array constitute a liquid crystal display part AR.

Further, in the respective pixel regions which are arranged in parallel in the x direction, a common counter voltage signal line CL which runs in the inside of the respective pixel regions is formed. The counter voltage signal line CL constitutes a signal line for supplying a voltage which becomes the reference with respect to a video signal to a counter electrode CT of the pixel region described later.

In each pixel region, a thin film transistor TFT which is driven in response to a scanning signal from the one-side gate signal line GL and a pixel electrode PX to which a video signal is supplied from the one-side drain signal line DL via this thin film transistor TFT are formed.

This pixel electrode PX generates an electric field between the pixel electrode PX and a counter electrode CT which is connected to the counter voltage signal line CL and controls the optical transmissivity of the liquid crystal in response to the electric field.

Respective ends of the above-mentioned gate signal lines GL extend beyond the above-mentioned sealing material SL and the extended ends thereof form terminals GLT to which output terminals of the scanning signal drive circuit V are connected. Further, to input terminal of the scanning signal drive circuit V, a signal from a printed circuit board (not shown in the drawing) which is arranged outside the liquid crystal display panel PNL is inputted.

The scanning signal drive circuit V is formed of a plurality of semiconductor devices. A plurality of gate signal lines GL which are arranged close to each other are formed into a group and one semiconductor device is allocated to each group of gate signal lines GL.

In the same manner, respective ends of the drain signal line DL extend beyond the sealing material SL and the extended ends constitute terminals DLT to which output terminals of the video signal drive circuit He are connected. Further, to input terminals of the video signal drive circuit He, a signal from a printed circuit board (not shown in the drawing) which is arranged outside the liquid crystal display panel PNL is inputted.

The video signal drive circuit He is also formed of a plurality of semiconductor devices. A plurality of drain signal lines DL which are arranged close to each other are formed into a group and one semiconductor device is allocated to each group of drain signal lines DL.

Further, the counter voltage signal lines CL are connected in common to a connection line at the right side in the drawing and the connection line extends beyond the sealing material SL and constitutes a terminal CLT at an extended end thereof. From the terminal CLT, a voltage which becomes the reference with respect to the video signal is supplied to the pixels.

Further, the liquid crystal display device having such a constitution is referred to as a liquid crystal display panel PNL and on the back surface of the liquid crystal display panel PNL, a backlight BL is arranged. Light from the backlight BL is transmitted to the respective pixels of the liquid crystal display panel PNL in response to the optical transmissivity and reaches to eyes of an observer.

Further, on an observer-side surface of the liquid crystal display panel PNL, an upper frame which forms an opening (a display window) therein above the liquid crystal display part AR is arranged, while a lower frame is arranged on a back surface of the backlight BL. These respective frames are integrally formed into a module by having sides thereof connected to each other by caulking, for example. In the explanation hereinafter, the display device which is formed into the module in this manner may be also referred to as a display module.

In the above-mentioned embodiment, the scanning signal drive circuit V and the video signal drive circuit He are constituted of semiconductor devices which are mounted on the transparent substrate SUB1. However, the scanning signal drive circuit V and the video signal drive circuit He may be formed of semiconductor devices of a so-called tape carrier method which are connected to each other while striding over the transparent substrate SUB1 and a printed circuit board, for example. Alternatively, when a semiconductor layer of the thin film transistor TFT is formed of a polycrystalline silicon (p-Si), semiconductor elements made of polycrystalline silicon may be formed on a surface of the transparent substrate SUB1 together with wiring layers.

Here, in this embodiment, the explanation has been made by taking the liquid crystal display device of a lateral field method as an example of the display device. However, it is needless say that the liquid crystal display device may be a liquid crystal display device of a vertical field method such as a TN method, a VA method or the like. Further, the display device may be a display device which adopts an electroluminescence array or the like.

In the electroluminescence array, in each pixel, an organic light emitting material layer is sandwiched by a pair of electrodes and a magnitude of light emission is controlled in response to a magnitude of an electric current which runs in the organic light emitting material layer. However, the electroluminescence array has the substantially similar constitution with the constitution of the liquid crystal display device with respect to following two points. That is, one point is that out of a pair of electrodes from the drain signal line, a video signal is supplied to a pixel electrode through a thin film transistor and, at the same time, the thin film transistor is driven in response to a scanning signal from a gate signal line. Another point is that out of the above-mentioned pair of electrodes, a counter electrode is formed in common with respective pixels and a signal which becomes the reference with respect to a video signal is supplied to the counter electrode.

In the explanation made hereinafter, the respective embodiments are explained by taking the liquid crystal display devices as an example. However, when the explanation of the present invention is made focusing on an electroluminescence array in case of necessity, such an explanation is specifically mentioned.

<<Constitution of the Back Surface>>

Figure 1:
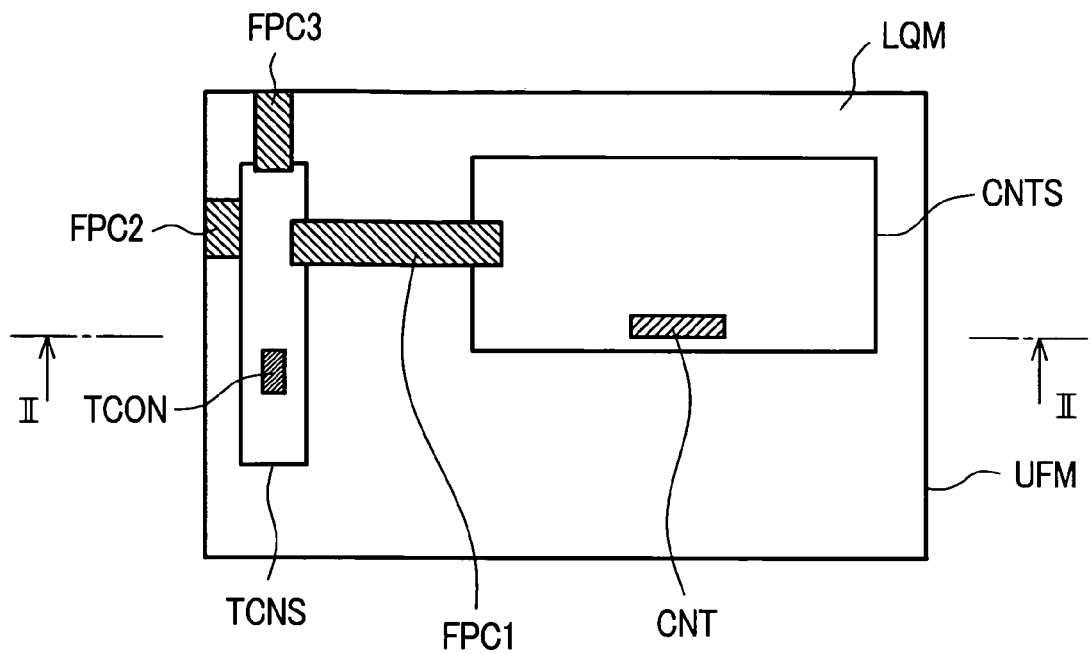
FIG. 1 is a constitutional view showing one embodiment of a display device according to a present invention and also is a view showing a back surface of a display module.

FIG. 1 is a view of a liquid crystal display module LQM as viewed from a back surface of the module LQM. As explained above, the liquid crystal display panel PNL side and the backlight BL are formed integrally by the lower frame UFM which is arranged on the backlight BL side and the upper frame FFM which is arranged on the liquid crystal display panel PNL and are formed into a module as a whole.

Accordingly, in FIG. 1 which is a view as viewed from the above-mentioned lower frame UFM side. In FIG. 1, on the surface of the lower frame UFM, a connector board CNTS and the display control circuit board TCNS are mounted.

The connector board CNTS is a board on which a connector CNT to which a video data is inputted from the outside of the liquid crystal display device and other members are mounted, while the display control circuit board TCNS is a board on which a display control circuit TCON to which a video data obtained via the connector board CNTS is inputted is mounted. The output from the display control circuit TCON is inputted to the scanning signal drive circuit V and the video signal drive circuit He.

Accordingly, the wiring of the connector board CNTS and the wiring of the display control circuit board TCNS are connected to each other by a flexible wiring board FPC1. Further, a flexible wiring board FPC2 which extends to the scanning signal drive circuit V from the display control circuit board TCNS and a flexible wiring board FPC3 which extends to the video signal drive circuit He from the display control circuit board TCNS are provided.

Here, by adopting the constitution in which the connector board CNTS is formed of the flexible wiring board FPC3 and the flexible wiring board FPC3 is directly engaged by fitting with the connector of the display control circuit board TCNS, or by adopting the constitution in which both of the connector board CNTS and the display control circuit board TCNS are directly engaged with each other by fitting using a board-to-board type connector, it is no more necessary to provide the flexible wiring board FPC1.

Here, as explained above, the connector board CNTS and the display control circuit board TCNS are constituted as boards which are independent from each other. Further, the display control circuit board TCNS is set smaller than the connector board CNTS with respect to a width and an area.

In the display device having such a constitution, by minimizing the size of the display control circuit board TCNS which has a complicated pattern and is expensive, the adjustment of the size can be performed using the member CNTS on which inexpensive connecting members are mounted and hence, an advantageous effect that the manufacturing cost can be reduced is obtained.

Embodiment 2

FIG. 2 is a view showing a cross section of a portion corresponding to the portion taken along a line II-II in FIG. 1. The constitution which makes this embodiment different from the embodiment shown in FIG. 1, first of all, lies in that a display control circuit board TCNS is arranged on a back surface of the liquid crystal display panel PNL, that is, on a back surface of a transparent substrate SUB1 of the liquid crystal display panel PNL. As described above, the display control circuit board TCNS is physically separated from the connector board CNTS and, further, an area of the display control board TCNS can be made small and hence, it is possible to arrange the display control circuit board TCNS on a back surface of a region of the transparent substrate SUB1 on which a scanning signal drive circuit V is mounted such that the display control circuit board TCNS can be accommodated in the region.

Further, the connector board CNTS is arranged on a back surface of a lower frame UFM such that the connector board CNTS is brought into contact with the lower frame UFM and, at the same time, a connector cnt1 which is mounted on the connector board CNTS is connected to a connector cnt2 which is mounted on the display control circuit board TCNS by the fitting engagement.

Figure 2A:
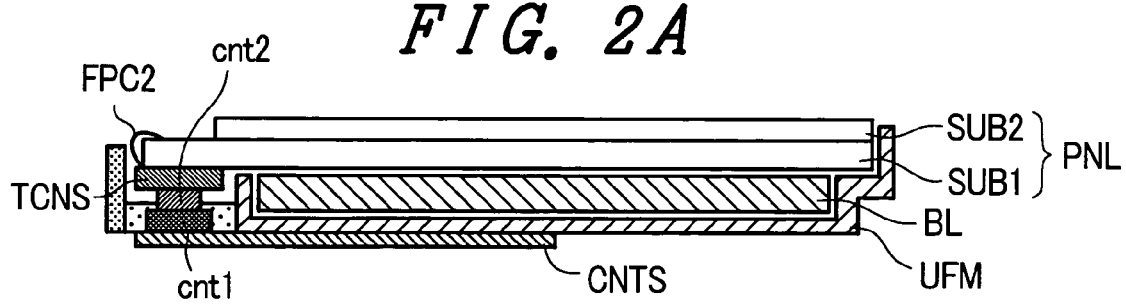
FIGS. 2A and 2B are views showing a cross section taken along a line II-II in FIG. 1.

In this case, to facilitate the connection between the connector board CNT and the display control circuit board TCNS, the lower frame UFM is formed such that the lower frame UFM does not cover the display control circuit board TCNS at such a connecting portion. For example, as shown in FIG. 2(a), the lower frame UFM is configured to be bent to be arranged close to and face a side surface of one eng periphery of a backlight BL.

Figure 2B:
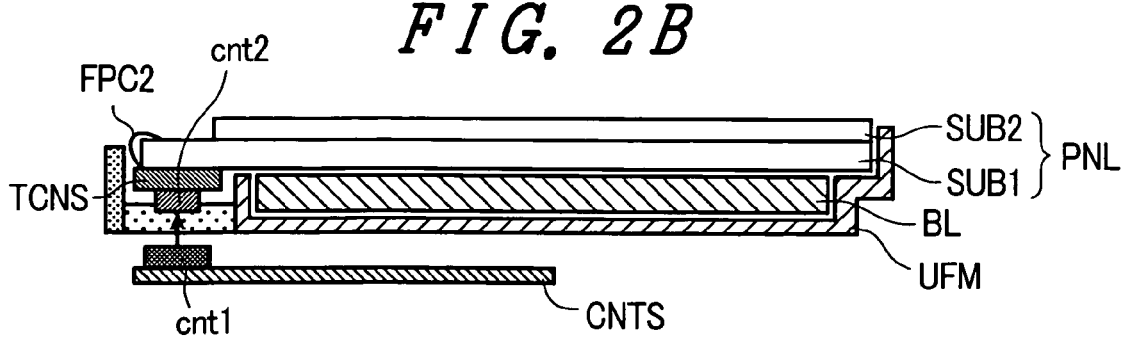

Due to such a constitution, as shown in FIG. 2(b), it is possible to easily separate the connector board CNTS from the display control circuit board TCNS or to easily connect these boards whereby it is possible to replace the connector board CNTS with a desired type of connector board depending on the request of a user.

Embodiment 3

Figure 3A:
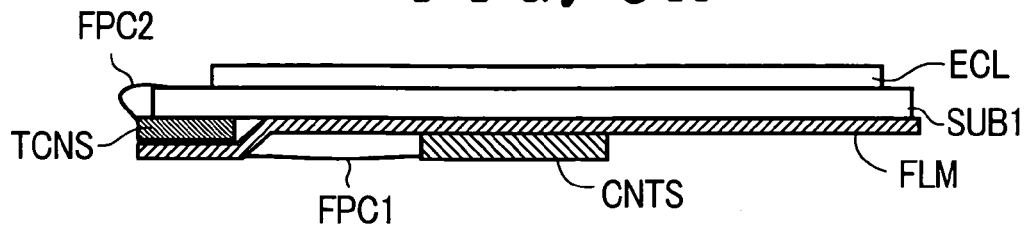
FIGS. 3A and 3B are constitutional views showing another embodiment of the display device according to a present invention and corresponds to FIG. 2.

FIG. 3(a) shows a display device which uses an electroluminescence array as a display panel PNL and corresponds to FIG. 2.

The display panel PNL forms an envelope using a transparent substrate SUB1, and a transparent sealing member ECL which is formed on a surface (a viewing-side surface) of the transparent substrate SUB1 and pixels are formed on a sealing member ECL side surface of the transparent substrate SUB1.

In the same manner as the embodiment shown in FIG. 2, the display control circuit board TCNS is arranged on a back surface of a display panel PNL such that the display control circuit board TCNS is brought into contact with the back surface of the display panel PNL, wherein terminals of the display control circuit board TCNS are pulled out to a pixel-side surface of the transparent substrate SUB1 by way of a flexible printed circuit board FPC2.

Further, in the display panel PNL, organic light emitting material layers per se in respective pixels emit light and hence, the display panel PNL is not provided with a back light BL different from the liquid crystal display device.

Accordingly, a connector board CNTS is arranged on and is brought into contact with a back surface of a frame which is arranged on a back surface of the display panel PNL and at the same time, the connector board CNTS is connected with the display control circuit board TCNS by way of a flexible printed circuit board FCP1.

Figure 3B:
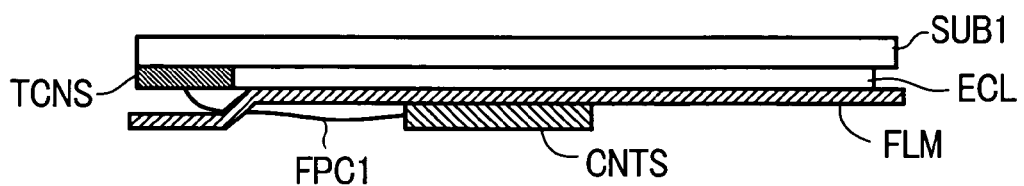

Although the display panel PNL shown in FIG. 3(b) has the substantially same constitution as the display panel PNL shown in FIG. 3(a), the transparent substrate SUB1 is positioned at a viewer side and a sealing material ECL is positioned at a frame FLM side in the display panel PNL. Due to such a constitution, a portion where the connector board CNTS is arranged constitutes a surface of the transparent substrate SUB1 where pixels are formed and hence, the flexible printed circuit board FPC2 which is required by the constitution shown in FIG. 3(a) becomes no more necessary.

Also with the provision of the display device described in this embodiment, in the same manner as the display device described in the embodiment 2, it is possible to easily exchange the connector board CNTS with a desired type of connector board to reply a request of a user.

Embodiment 4

Figure 4A:
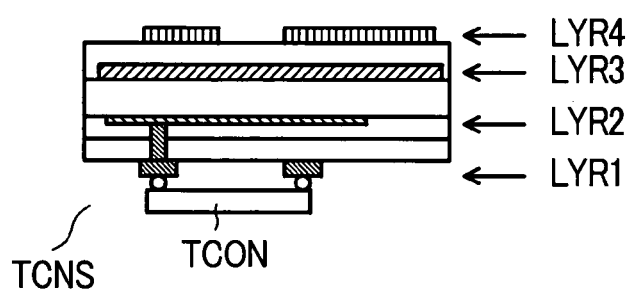
FIGS. 4A and 4B are cross sectional views showing one embodiment of a display control circuit board and a connector board shown in FIG. 1.
Figure 4B:
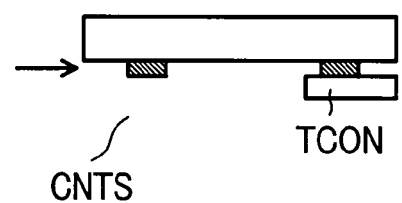

FIG. 4(a) and FIG. 4(b) are views which respectively show cross sections of the display control circuit board TCNS and the connector board CNTS shown in the above-mentioned respective embodiments.

The display control circuit board TCNS is, as shown in FIG. 4(a), formed by stacking respective wiring layers which is constituted of a first layer LYR1, a second layer LYR2, a third layer LYR3 and a fourth layer LYR4 by way of insulation films from a surface on which a display control circuit TCON thereof is mounted.

Here, the wiring layer which forms the first layer LYR1 constitutes connection lines for establishing the connection with the display control circuit TCON, the wiring which forms the second layer LYR2 constitutes crossing lines, the wiring layer which forms the third layer LYR3 constitutes a ground (earth) line, and the wiring layer which forms the fourth layer LYR4 constitutes a power source line.

On the other hand, in the connector board CNTS, as shown in FIG. 4(b), on the surface on which the connector CNT is mounted, the connection wiring with the connector CNT is only formed as the first layer LYR1.

Although in this embodiment, the numbers of stacked layers of the respective wiring of the display control circuit board TCN and the connector board CNTS are configured as mentioned above, it is needless to say that the number of stacked layers is not limited to this number. However, it is necessary that the number of stacked layers of the display control circuit board TCNS is configured to be larger than the number of the stacked layers of the connector board CNTS. This is because that, for minimizing the size other than the effective display region of the display device, the size which is referred to as a so-called frame and for reducing cost, it is necessary that the area of the display control circuit board TCNS is smaller than the area of the connector board CNTS.

Due to such a constitution, under the circumstance that the specification of the connector board CNTS differ depending on requests of clients, since the number of wiring layers of the member is small, it is possible to manufacture the connector board CNTS in a short period to reply a new request.

Embodiment 5

Figure 5A:
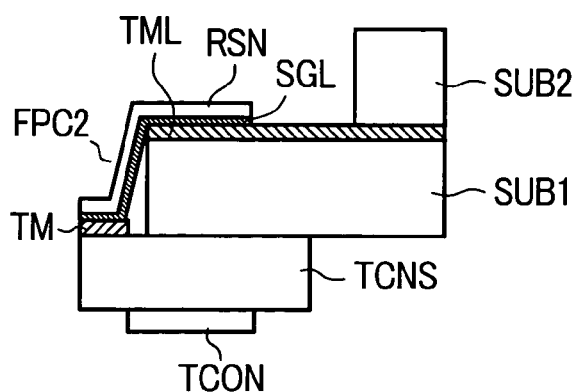
FIGS. 5A and 5B are cross sectional views showing one embodiment of the constitution of a portion of a display panel PNL and the display control circuit board which is arranged close to the display panel PNL.

As shown in FIG. 5(a), a terminal TML is formed on a liquid-crystal-side surface of a transparent substrate SUB1 of a liquid crystal display panel PNL. A display control circuit board TCNS is formed on a surface side of the transparent substrate SUB1 opposite to the surface on which the terminal TML is formed, wherein the display control circuit board TCNS is arranged to face the surface opposite to the surface on which the display control circuit TCON is mounted.

The display control circuit board TCNS has a terminal TM which is pulled out from the display control circuit TCON on the surface opposite to the surface on which the display control circuit TCON is mounted and the terminal TM is connected to the above-mentioned terminal TML of the liquid crystal display panel PNL by way of the flexible printed circuit board FPC2.

Since the terminal TML of the liquid crystal display panel PNL and the terminal TM of the display control circuit board TCNS are configured to be arranged to form a stepped portion therebetween, a flexible printed circuit board FPC2 which is served for electrically connecting these terminals is formed of a material which has a conductive layer SGL only on one surface of a resin layer RSN whereby the manufacturing cost can be reduced.

Here, the constitution shown in FIG. 5(a) is a constitution of the liquid crystal display panel PNL which is taken as an example. However, an electroluminescence array can also have the substantially equal constitution in this embodiment. This is because a transparent substrate SUB1 of the structure shown in FIG. 5(a) is merely replaced with a sealing member ECL in the electroluminescence array.

Figure 5B:
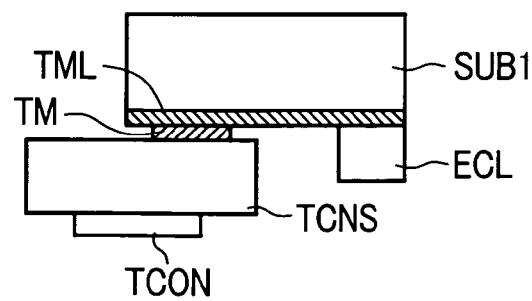

Further, although FIG. 5(b) shows an embodiment in which the electroluminescence array is used as the display panel PNL, this embodiment shows a so-called bottom emission type which allows the arrangement of a transparent substrate SUB1 at an observer's side.

In this case, a terminal TML of the display panel PNL has the relationship that the display panel PNL and the display control circuit board TCNS are arranged such that a terminal TML of the display panel PNL faces a terminal TM of a display control circuit board TCNS. Accordingly, for example, it is possible to connect the terminal TML and the terminal TM using an anisotropic conductive layer or the like in a state that the terminal TML and the terminal TM face each other in an opposed manner without using the flexible printed circuit board FPC, for example.

In any of these constitutions, with respect to the connection between the terminal TML of the display panel PNL and the terminal TM of the display control circuit board TCNS, the distance between the terminals can be shortened and hence, the power supply resistance can be reduced.

Embodiment 6

Figure 6A:
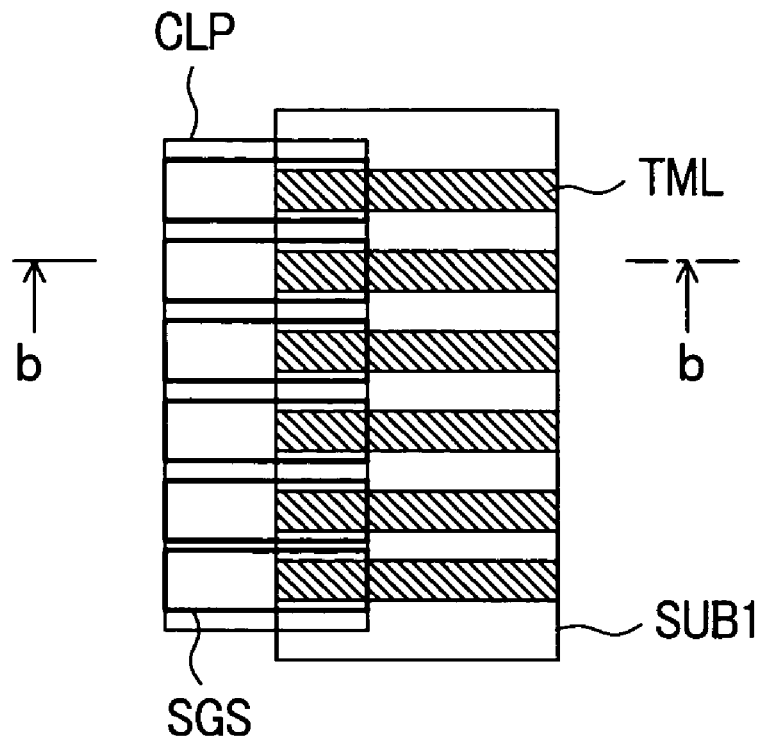
FIGS. 6A and 6B are cross sectional views showing another embodiment of the constitution of a portion of the display panel PNL and the display control circuit board which is arranged close to the display panel PNL.
Figure 6B:
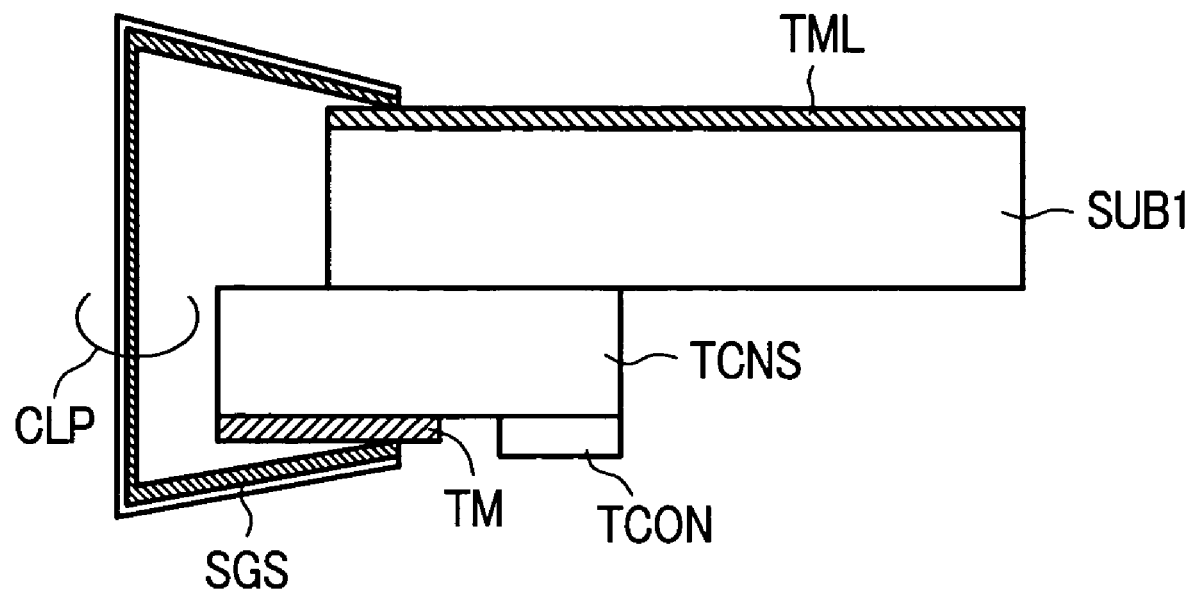

FIG. 6(a) shows, in the constitutions of the above-mentioned respective embodiments, another connection structure of the terminals TML formed on the liquid crystal display panel PNL and the terminals of the display control circuit board TCNS. FIG. 6(b) is a cross-sectional view taken along a line b-b in FIG. 6(a).

In such a constitution, this embodiment is directed to the display control circuit board TCNS in which the terminal TM is formed on a mounting surface of the display control circuit TCON. The display control circuit board TCNS is arranged to face a transparent substrate SUB1 of the display panel PNL at a surface thereof opposite to a surface thereof on which the terminals TM are formed, wherein the terminal TML of the transparent substrate SUB1 is formed on a surface opposite to the display control circuit board TCNS.

A pitch of the respective terminals TML which are arranged in parallel on the display panel PNL is set equal to a pitch of respective terminals TM which are arranged in parallel on the display control circuit board TCNS. To connect these terminals TML and TM respectively, these terminals are electrically connected with each other by way of respective conductive portions SGS formed on an inner surface of clip CLP which is mounted so as to clamp side surface portions of the transparent substrate SUB1 and the display control circuit board TCNS which are arranged in a state that their back surfaces abut against each other.

That is, the clip CLP is formed of a resilient member having a "C" shape which is formed to cover a plurality of respective terminals and is provided with a plurality of conductive portions SGS are arranged in parallel on the inner surface thereof.

Due to such a constitution, mounting of the clip CLP becomes extremely easy and hence, eventually, it is possible to have an advantageous effect that the connection between the terminals TML of the display panel PNL and the terminals TM of the display control circuit board TCNS becomes extremely easy.

Embodiment 7

Figure 7A:
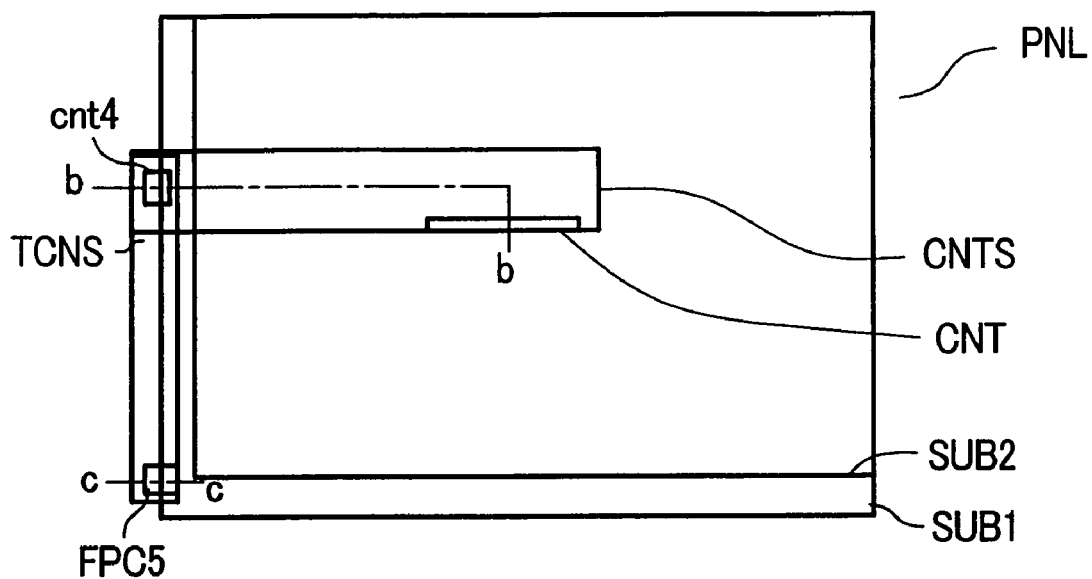
Figure 7B:
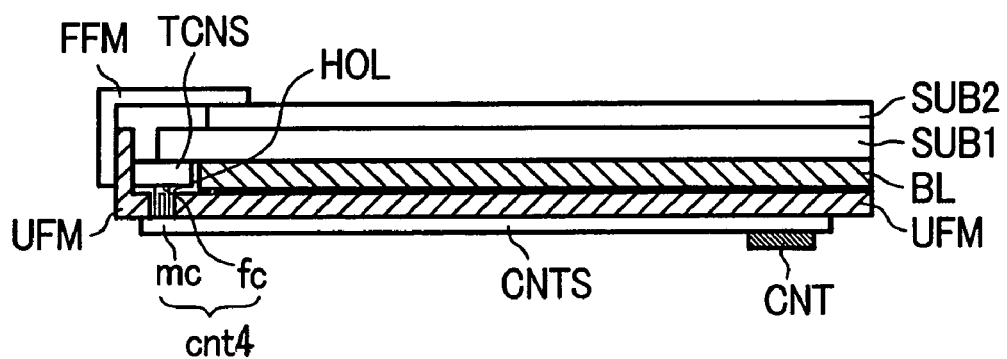
Figure 7C:
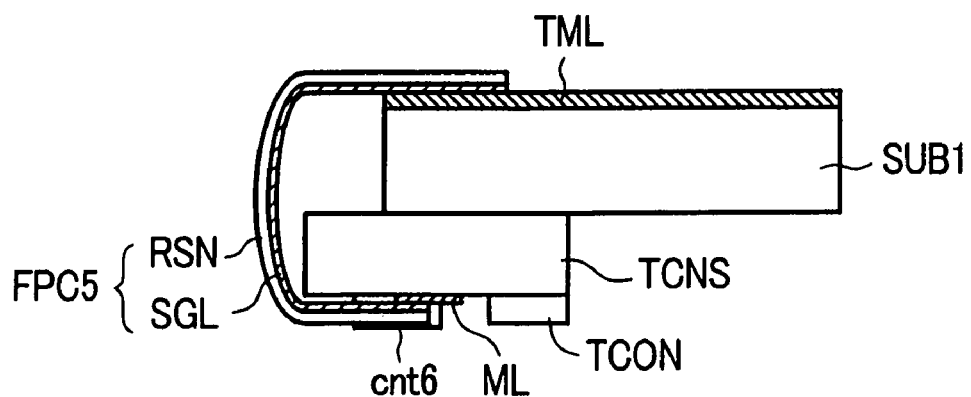

FIG. 7(a) is a plan view showing another embodiment of the liquid crystal display device according to the present invention. FIG. 7(a) is a view obtained by viewing a display panel PNL from an observers side, wherein a connector board CNTS, a display control circuit board TCNS and the like which are arranged at a back surface of the display panel PNL are depicted as a see-through view penetrating the display panel PNL. FIG. 7(b) shows a cross section taken along a line b-b in FIG. 7(a) and FIG. 7(c) shows a cross section taken along a line c-c in FIG. 7(a).

First of all, in the same manner as the above-mentioned embodiments, the display control circuit board TCNS is arranged on a back surface side of a transparent substrate SUB1 of the display panel PNL and the connector board CNTS is arranged on a back surface of a lower frame UFM. In such a constitution, the electrical connection between the connector board CNTS and the display control circuit board TCNS is established through an opening HOL formed in a lower frame UFM, wherein, for example, a female connector cnt4(fc) which is mounted on a display control circuit board TCNS side and a male connector cnt4(mc) Which is mounted on a connector board CNTS side are engaged with each other by fitting in the opening HOL portion.

Due to such a constitution, even after the completion of a liquid crystal display module, it is possible to easily perform mounting of the connector board CNTS. Further, in fixing the lower frame UFM and an upper frame FFM by caulking for example, it is unnecessary to shrink a fixed portion of the lower frame UFM, the reliability of fixing the lower frame UFM to the upper frame FFM can be ensured.

Further, the electrical connection between the terminal TM of the display control circuit board TCNS and the terminal TML of the display panel PNL can achieve the easy and reliable contact by applying the above-mentioned embodiments.

However, as shown in FIG. 7(c), it is needless to say that the electrical connection between the terminal TM of the display control circuit board TCNS and the terminal TML of the display panel PNL can be established using the constitution different from the constitutions of the above-mentioned embodiments. FIG. 7(c) corresponds to the above-mentioned FIG. 6(a), wherein a flexible printed circuit board FPC5 is used in place of the clip CLP. The flexible printed circuit board FPC has one end thereof connected to the terminal TML of the display panel PNL and another end extended to round about side surface portions of the display panel PNL and the display control circuit board TCNS. Further, an extended end of the flexible printed circuit board FPC is inserted into a connector cnt6 which is mounted on the side surface portion of the display control circuit board TCNS thus establishing the electrical connection with the terminal TM of the display control circuit board TCNS.

Embodiment 8

Figure 8A:
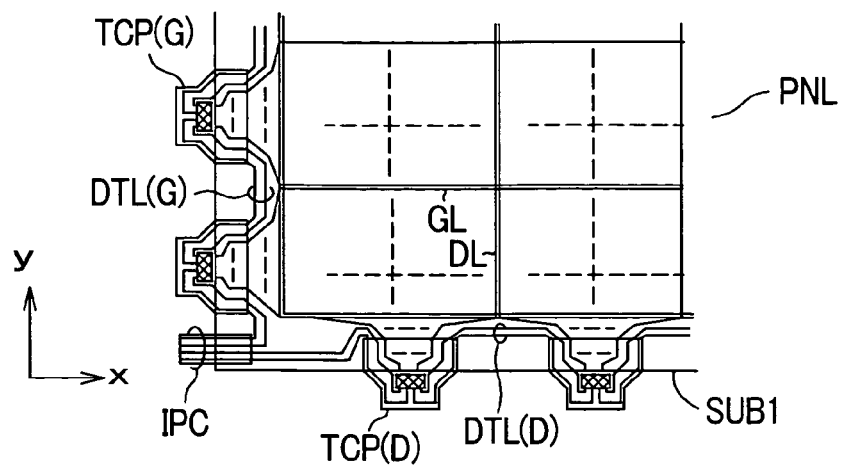
FIGS. 8A, 8B and 8C are constitutional views showing another embodiment of a display device according to a present invention and also a plan view showing the constitution of the display panel PNL.

FIG. 8(a) is a plan view showing one embodiment of portions of a liquid crystal display panel PNL where a scanning signal drive circuit V and a video signal drive circuit He are mounted in detail.

First of all, the scanning signal drive circuit V is constituted of a plurality of so-called tape-carrier type semiconductor devices TCP(G). Here, the tape-carrier type semiconductor device is a semiconductor device having the constitution in which a chip-like semiconductor layer is formed on a surface of a flexible board and input terminals and output terminals thereof are pulled out to terminals which are formed on a portion of a periphery of the board through a wiring layer formed on a surface of the board. The terminals of the board are connected to terminals to be connected of the liquid crystal display panel PNL through anisotropic conductive films or the like, for example.

Here, each semiconductor device TCP (G) is connected with a plurality of gate signal lines GL which are arranged close to the semiconductor device TCP(G) and are arranged close to each other. Respective gate signal lines GL are formed with a pattern in which the gate signal lines GL extend to a portion close to the semiconductor device TCP(G) and are bent toward the semiconductor device TCP(G) side to converge each other. This is because a terminal pitch of the semiconductor device TCP(G) is set smaller than a wiring pitch of the respective gate signal lines GL.

In this embodiment, a signal from the display control circuit board TCNS through an input line IPC is inputted to the semiconductor device TCP(G) which is arranged close to the input line IPC, while an output of the semiconductor device TCP(G) is inputted to another semiconductor device TCP(G) which is arranged next to the preceding semiconductor device TCP(G). In this manner, the respective semiconductor devices TCP(G) of the scanning signal drive circuit V are driven by n pieces of data transfer lines DTL(G) and the respective semiconductor devices TCP(G) respectively and sequentially transmit the scanning signal to the gate signal lines GL which the respective semiconductor devices TCP(G) control.

The video signal drive circuit He is also constituted of a plurality of tape-carrier type semiconductor devices TCP(D).

Each semiconductor device TCP(D) is, in the same manner as each semiconductor device TCP(G) of the scanning signal drive circuit V, connected with a plurality of drain signal lines DL which are arranged close to the semiconductor device TCP(D) and are arranged close to each other. Respective drain signal lines DL are formed with a pattern in which the drain signal lines DL extend to a portion close to the semiconductor device TCP(D) and are bent toward the semiconductor device TCP(D) side to converge each other. This is because a terminal pitch of the semiconductor device TCP(D) is set smaller than a wiring pitch of the respective drain signal lines DL.

Then, a signal from the display control circuit board TCNS through an input line IPC is inputted to the semiconductor device TCP(D) which is arranged close to the input line IPC, while an output of the semiconductor device TCP(D) is inputted to another semiconductor device TCP(D) which is arranged next to the preceding semiconductor device TCP(D). In this manner, the respective semiconductor devices TCP(D) of the video signal drive circuit He are driven by m pieces of data transfer lines DTL(D) and the respective semiconductor devices TCP(D) respectively and sequentially output the video signal to the drain signal lines DL which the respective semiconductor devices TCP(D) control.

Here, the number m of the data transfer lines DTL(D) in the video signal drive circuit He is set larger than the number n of the data transfer lines DTL(G) in the scanning signal drive circuit V.

Figure 8B:
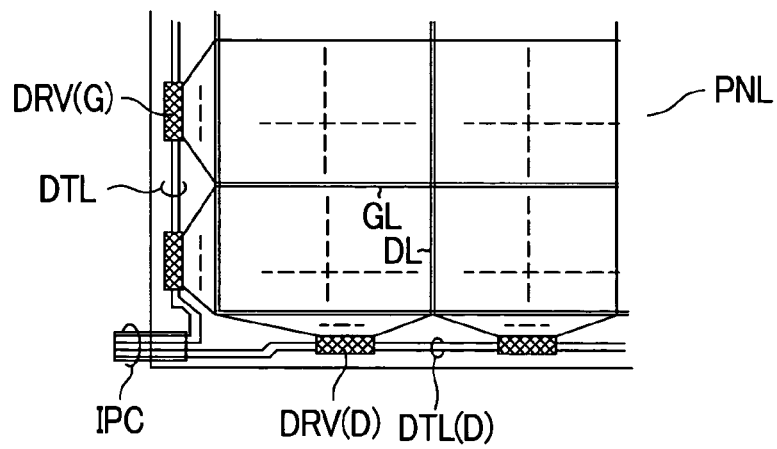

FIG. 8(b) is a plan view showing another embodiment of portions of a liquid crystal display panel PNL where a scanning signal drive circuit V and a video signal drive circuit He are mounted in detail and corresponds to FIG. 8(a).

The constitution which makes this embodiment different from the embodiment shown in FIG. 8(a) lies in that as a plurality of semiconductor devices which constitute a scanning signal drive circuit V, chip-like semiconductor devices DRV(G) which are directly mounted on a transparent substrate SUB1 are used, while as a plurality of semiconductor devices which constitute a video signal drive circuit He, chip-like semiconductor devices DRV(D) which are directly mounted on the transparent substrate SUB1 are used.

Figure 8C:
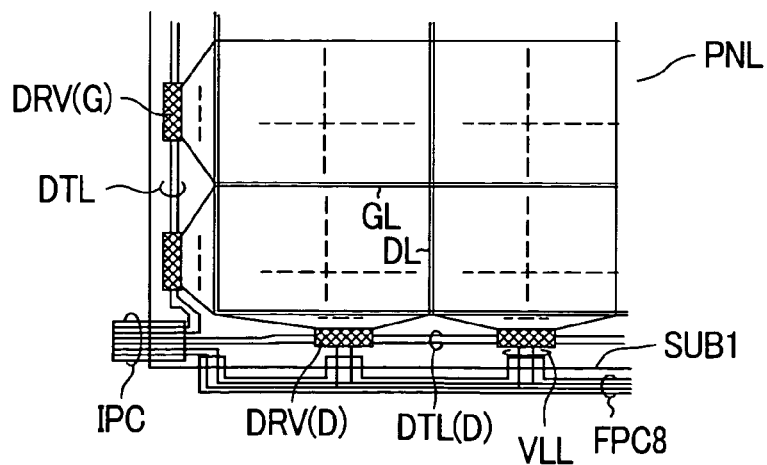

FIG. 8(c) is a plan view showing another embodiment of portions of a liquid crystal display panel PNL where a scanning signal drive circuit V and a video signal drive circuit He are mounted in detail and corresponds to FIG. 8(b).

The constitution which makes this embodiment different from the embodiment shown in FIG. 8(a) lies in that among signals transmitted from a display control circuit board TCNS through an input line IPC, the signal for power supply is configured to be inputted to respective semiconductor device DRV(D) through a flexible printed circuit board8 using p pieces of power source signal lines VLL.

The flexible printed circuit board8 is configured to be arranged close to the transparent substrate SUB1 and to extend in the parallel-direction of the respective semiconductor devices DRV(G) of the video signal drive circuit He.

Figure 9A:
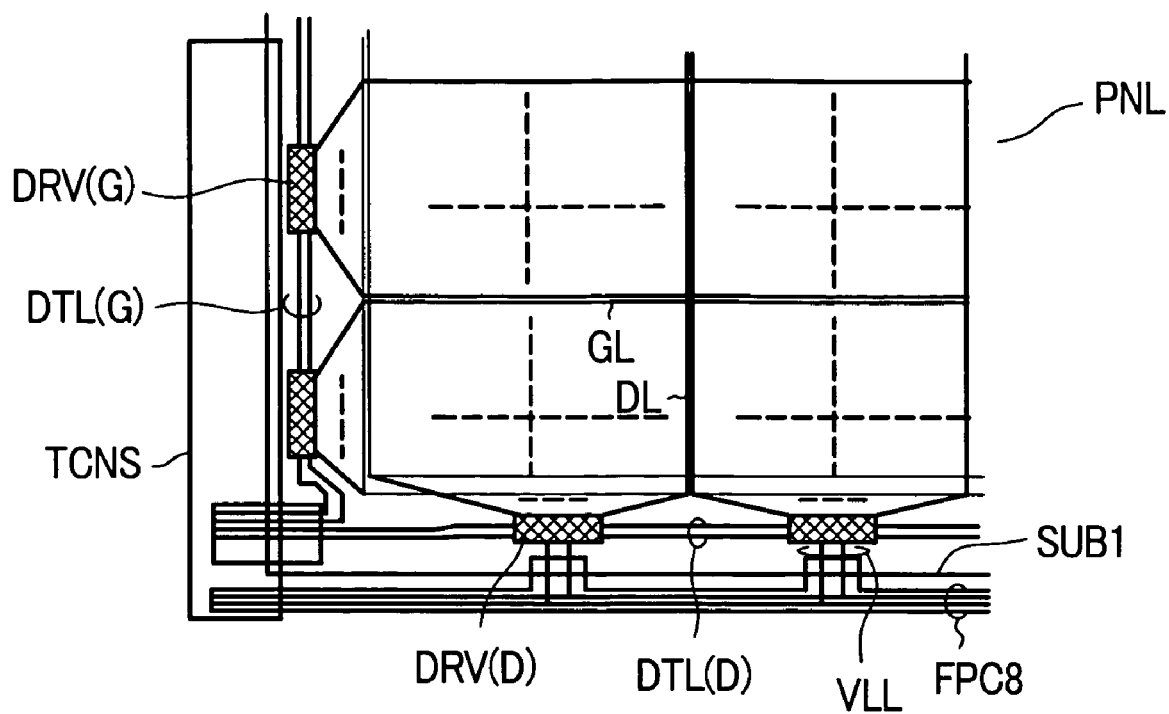
FIGS. 9A and 9B are constitutional views showing another embodiment of a display device according to a present invention and also a plan view showing the constitution of the display panel PNL.

FIG. 9(a) is a plan view showing another embodiment of portions of a liquid crystal display panel PNL where a scanning signal drive circuit V and a video signal drive circuit He are mounted in detail and corresponds to FIG. 8(c).

The constitution which makes this embodiment different from the embodiment shown in FIG. 8(c) lies in that, first of all, with respect to sides of a transparent substrate SUB1, a display control circuit board TCNS is arranged close to the side of the transparent substrate SUB1 at a scanning signal drive circuit V side, and the data transfer lines DTL(G) of the scanning signal drive circuit V and the data transfer lines DTL(D) of the video signal drive circuit He are pulled out from the display control circuit board TCNS.

Then, signal lines for power supply to the respective semiconductor devices DRV(D) of the video signal drive circuit He also directly arranged from the display control circuit board TCNS through a flexible printed circuit board FPC8. The connection of the flexible printed circuit board8 with the respective semiconductor devices DRV(D) is established using p pieces of power source signal lines VLL.

Due to such a constitution, for example, in comparison with a case in which power source is supplied to the respective semiconductor devices DRV(D) via a wiring layer on the transparent substrate SUB1, two contact points can be eliminated and hence, the reduction of connection resistance can be achieved and the reduction of power consumption can be achieved.

Figure 9B:
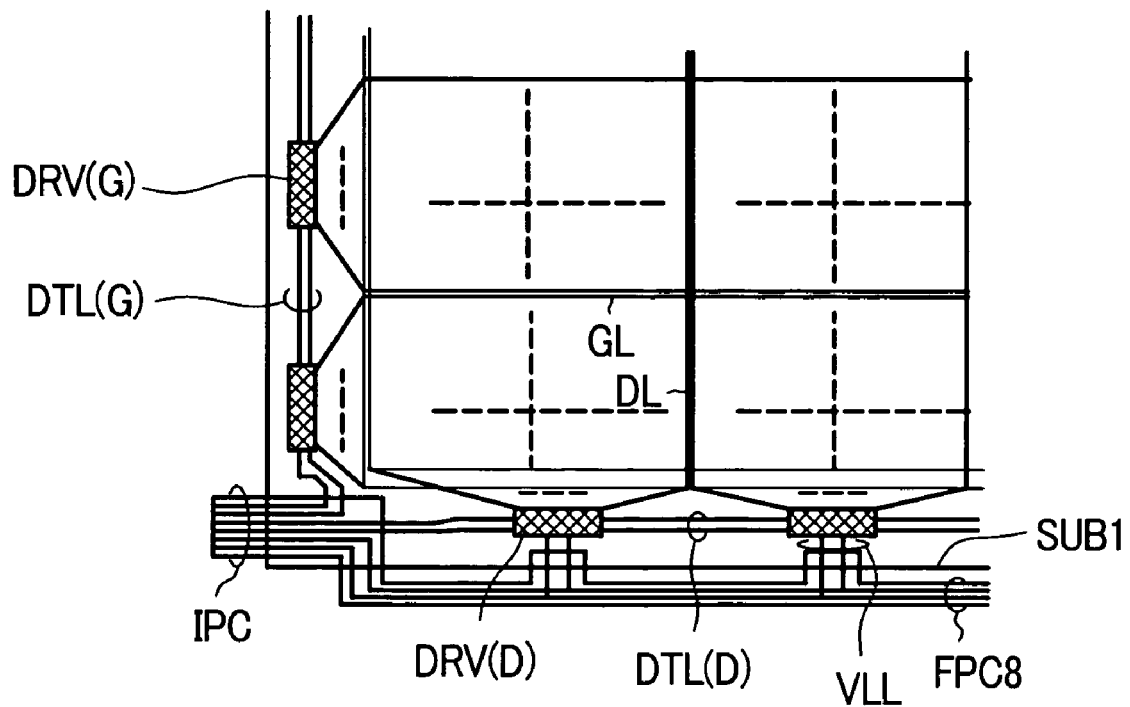

FIG. 9(*b*) is a plan view showing another embodiment of portions of a liquid crystal display panel PNL where a scanning signal drive circuit V and a video signal drive circuit He are mounted in detail and corresponds to FIG. 8(*c*).

The constitution which makes this embodiment different from the embodiment shown in FIG. 8(*c*) lies in that an input line IPC from the display control circuit board TCN is formed of a flexible printed circuit board and this printed circuit board is integrally formed with a flexible printed circuit board FPC8 for power supply to the respective semiconductor devices DRV(D) of a video signal drive circuit He.

Further, the flexible printed circuit board which constitutes the input line IPC from the display control circuit board TCN also constitutes a connection board for connecting the respective semiconductor devices DRV(G) of the scanning signal drive circuit board V with data transfer lines DTL(G).

Due to such a constitution, the number of connection points of the flexible board to a liquid crystal display panel (a transparent substrate SUB1) can be reduced and hence, it is possible to eliminate the cumbersomeness in performing the alignment at the time of performing the connecting operation.

Embodiment 9

Figure 10A:
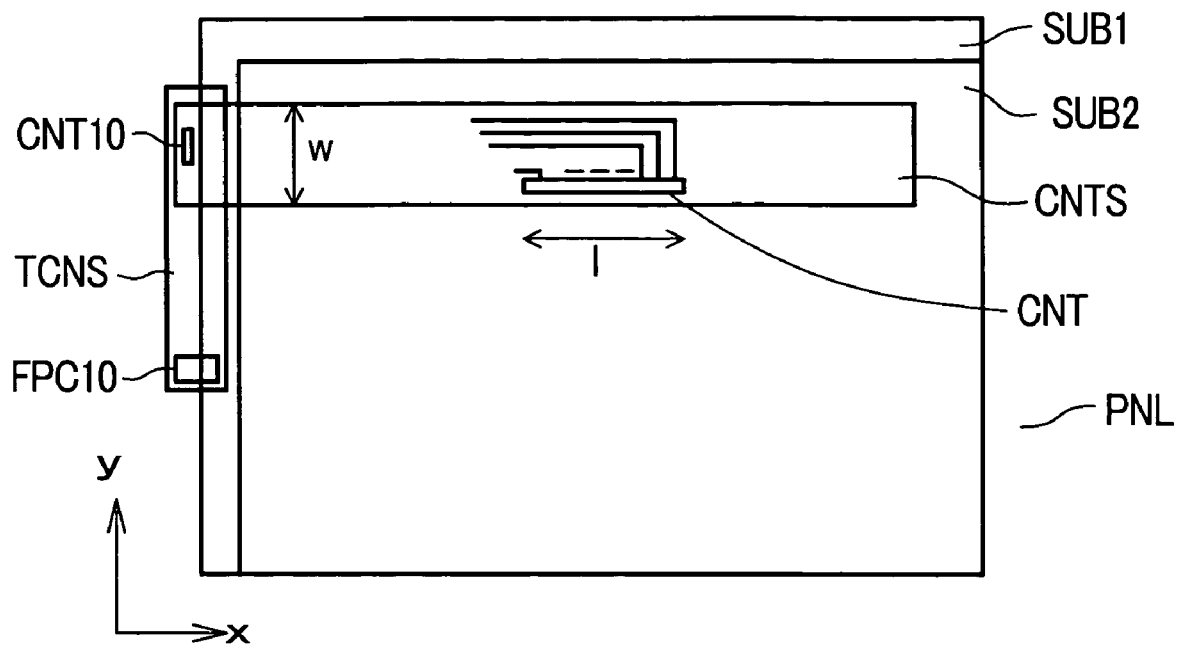
FIGS. 10A and 10B are constitutional views showing another embodiment of a display device according to a present invention and is also a view showing a connector to which external video date is inputted.
Figure 10B:
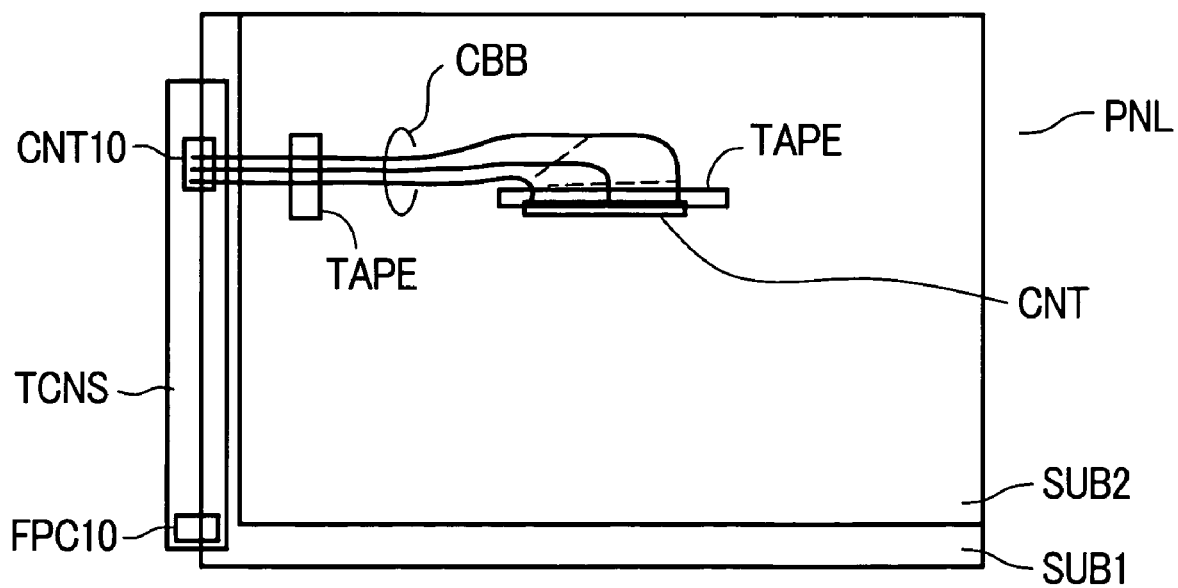
Figure 11A:
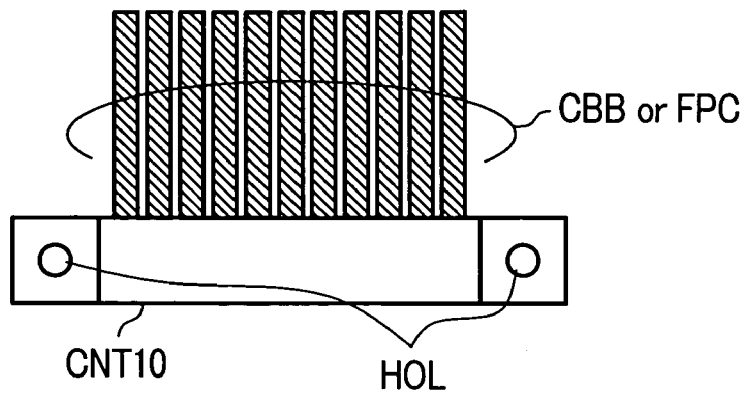
Figure 11B:
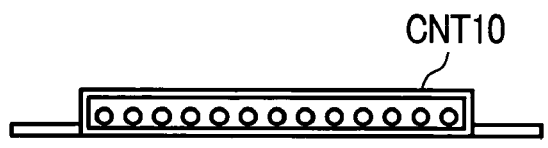
Figure 11C:
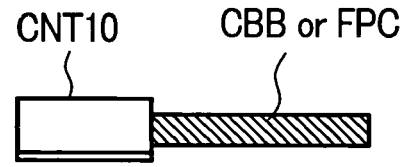
Figure 11D:
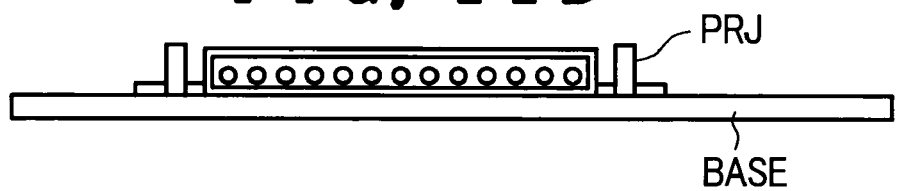
Figure 11E:
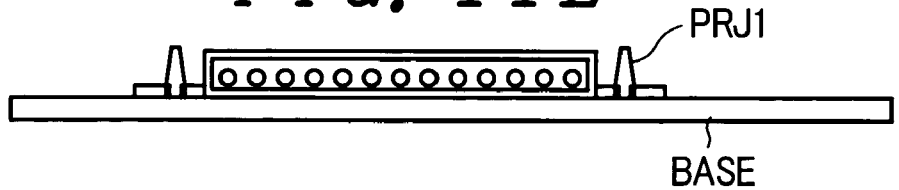
Figure 11F:
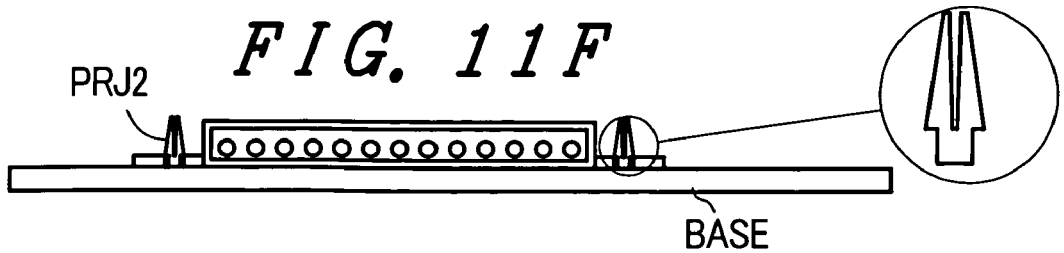

FIG. 10(*a*) is a constitutional view showing another embodiment of the liquid crystal display device according to the present invention and corresponds to FIG. 7(*a*). That is, the arrangement relationship between a connector board CNTS and a display control circuit board TCNS is shown in conjunction with a display panel PNL in a see-through view.

In this embodiment, on a rectangular connector board CNT which extends in the x direction in the drawing, a connector CNT is mounted such that the parallel mounting direction of the terminals of the connector CNT is aligned with the x direction.

In this case, assuming a width of the connector CNT in the direction that the terminals are arranged in parallel as 1, a width w of the connector board CNTS is set smaller than 1. In other words, the connector board CNTS is formed in a rectangular shape having a relatively narrow width w and a long length in the lengthwise direction.

To further express in other words, the connector board CNTS sets a portion thereof which is connected to the display control circuit board TCNS as one end thereof and extends toward another end side, while the connector CNT is arranged such that the direction that the terminals thereof are arranged in parallel is substantially aligned with the extending direction of the connector board CNTS, and the width 1 of the connector CNT in the direction that the terminal thereof extends is in parallel set larger than the width w in the direction which crosses the extending direction of the connector board CNTS.

Due to such a constitution, the width of the connector board CNTS can be reduced and hence, the manufacturing cost can be reduced eventually. Further, on the connector board CNTS, a wiring length from the connector CNT to the display control circuit board TCNS can be made short and hence, the attenuation of a signal which propagates through the wiring can be suppressed.

Further, FIG. 10(*b*) is a constitutional view showing another embodiment of a display device according to the present invention and corresponds to FIG. 10(*a*). The constitution which makes this embodiment different from the embodiment shown in FIG. 10(*a*) lies in that a connector CNT is not provided with a board on which the connector CNT is mounted and is connected to a display control circuit board TCNS through a bundle CBB of cables.

The bundle of cables CBB in the vicinity of the display control circuit board TCNS and the bundle of cables CBB in the vicinity of the connector CNT are respectively fixed to a lower frame UFM using an adhesive tape TAPE, for example.

Due to such a constitution, it is possible to freely set the position of the connector CNT and, further, the position of the connector CNT can be also freely changed by peeling the adhesive tape TAPE and, thereafter, by fixing the connector CNT using the adhesive tape TAPE again.

Embodiment 10

FIG. 11(*a*) is a plan view showing a connector CNT10 which is mounted on at least one end of the flexible printed circuit board FPC or the cable CBB used in the above-mentioned embodiment. Here, FIG. 11(*b*) is a front view and FIG. 11(*c*) is a side view.

As a means which ensures the fixing relationship between the connector CNT10 and a board BASE on which the connector CNT10 is mounted, for example, holes HOL are formed.

That is, as shown in FIG. 11(*d*), the connector CNT10 is arranged such that projecting portions PRJ formed on the board BASE are fitted into the holes HOL. Due to such a constitution, the fixing of the board BASE and the connector CNT10 can be achieved.

Further, FIG. 11(*e*) shows another embodiment of mounting of a connector CNT10 on a board BASE. As the projecting portions PRJ, projecting portions PRJ2 having a shape which is gradually widened from a distal end thereof toward the board BASE side and later is narrowed are used. With the use of such projecting portions PRJ2, the removal of the connector CNT10 after fixing the connector CNT10 can be obviated.

Further, FIG. 11(*f*) shows projecting portions PRJ3 which are obtained as a result of further improvement of the above-mentioned projecting portion PRJ2, wherein a distal end of the projecting portion PRJ2 having the above-mentioned shape has a split shape. Due to such a constitution, the connector CNT10 has both of an advantageous effect that the connector CNT10 can be easily fitted and an advantageous effect that the connector CNT10 is hardly removed.

Embodiment 11

Figure 12A:
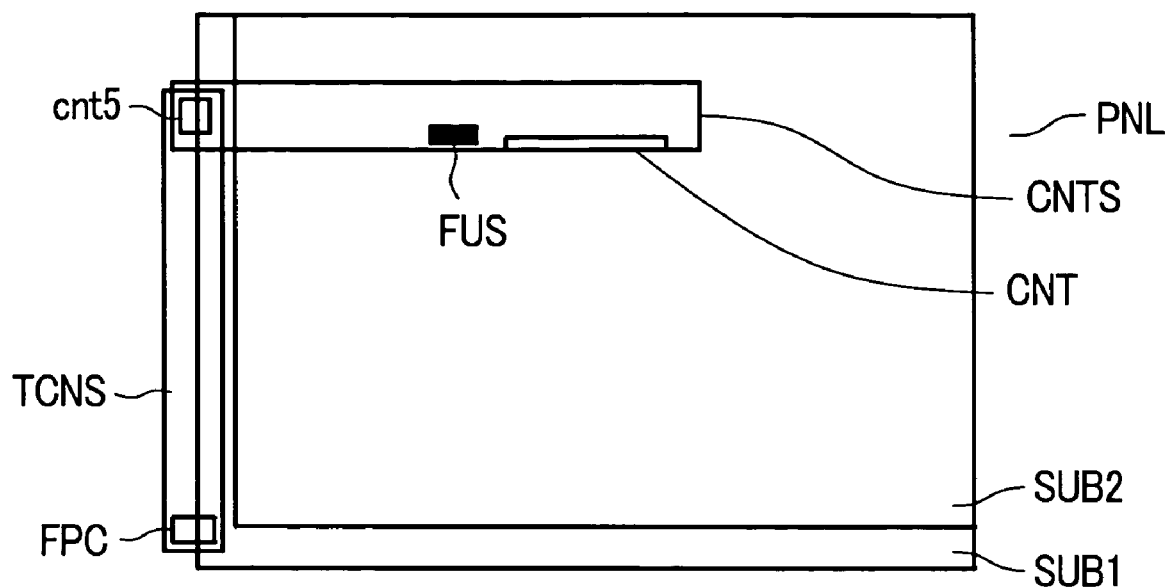
FIGS. 12A and 12B are plan views showing one embodiment of the constitution of the connector board and the display control circuit board.

FIG. 12(*a*) is a plan view showing another embodiment of the display device according to the present invention and corresponds to FIG. 7(*a*).

The constitution which makes this embodiment different from the embodiment shown in FIG. 7(*a*) lies in that on a connector board CNTS, a fuse FUS is mounted besides a connector CNT, wherein the generation of an eddy current at a display control circuit board TCNS side can be obviated by the fuse FUS.

Due to such a constitution, even when the eddy current is generated, the fuse FUS functions and hence, it is possible to protect the display control circuit TCNS from the eddy current. Further, even when the fuse FUS becomes inoperable, it is sufficient to perform only the exchange of the connector board CNTS and hence, the repairing is extremely facilitated.

Figure 12B:
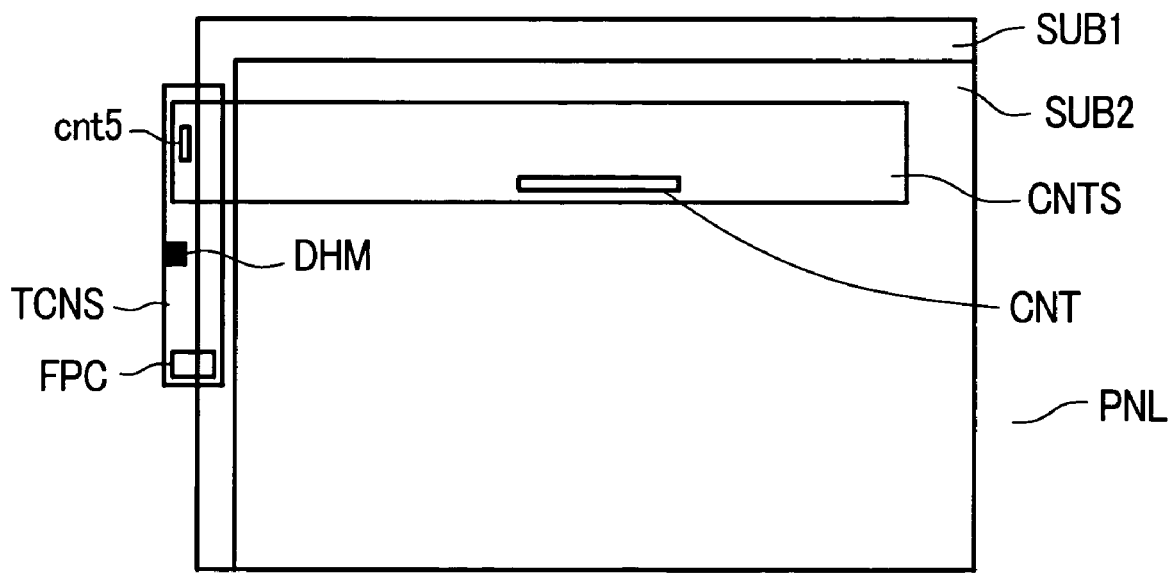

Further, FIG. 12(b) is a plan view showing another embodiment of the display device according to the present invention and corresponds to FIG. 7(a).

The constitution which makes this embodiment different from the embodiment shown in FIG. 7(a) lies in that a data storage medium DHM is mounted on a display control circuit board TCNS.

As an example of information stored in the inside of the data storage medium DHM, for example, data or the like for instructing signals indicative of a set value of γ characteristics, a set value of gray scale voltage or the reduction of power consumption to a display control circuit board TCNS is named. The data storage medium DHM may be any type of medium such as a ROM, a flash memory or the like, for example, which is capable of electrically reading information. Further, the data storage medium DHM may be incorporated into the inside of the display control circuit board TCNS.

Due to such a constitution, by supplying a signal from a connection connector of the display control circuit board TCNS at a stage prior to mounting of the connector board CTNS, it is possible to obtain an advantageous effect that the normal inspection can be performed.

Embodiment 12

Figure 13:
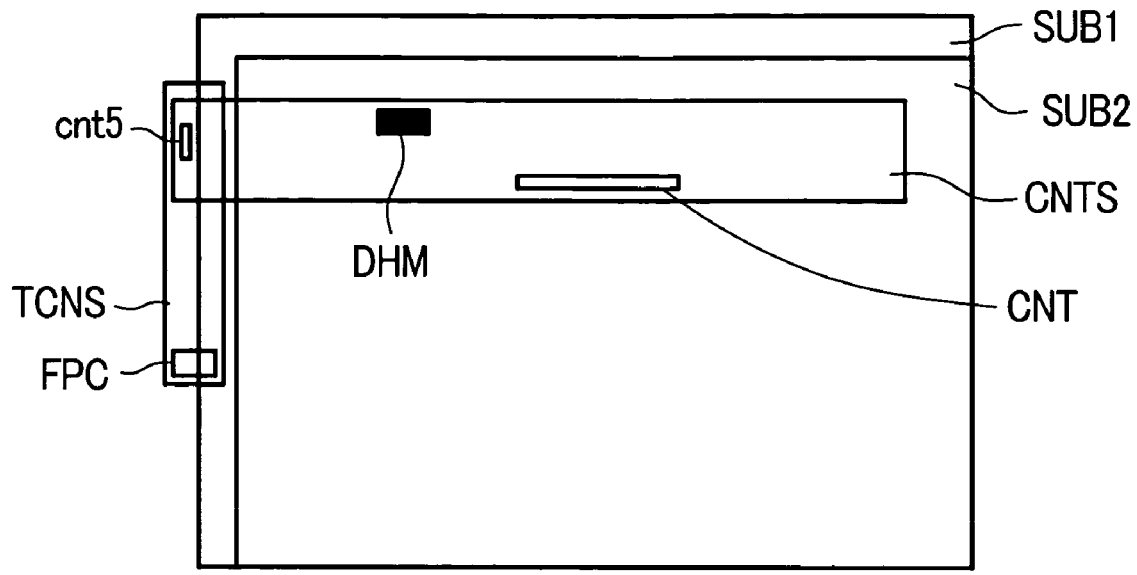
FIG. 13 is a plan view showing another embodiment of the constitution of the display control circuit board.

Further, FIG. 13 is a view showing another embodiment of the display device according to the present invention and corresponds to FIG. 12(b).

The constitution which makes this embodiment different from the embodiment shown in FIG. 12(b) lies in that a data storage medium DHM is not mounted on a display control circuit board TCNS side but is mounted on a connector board CNTS side.

Further, using the data storage medium DHM, information on the specification of a panel, information on a maker, information on types of products and the like may be transmitted to the outside.

Due to such a constitution, the information on the panel can be automatically grasped from the outside and hence, a video output circuit or a VGA card can be set from the outside. For example, by merely recording maker codes, even when compatible parts are purchased from a plurality of makers and the display device is manufactured, the manufacturing maker can be easily recognized whereby the automatic adjustment of the video output circuit or the VGA card can be performed whereby the enhancement of the compatibility can be more easily realized.

In this case, by providing the data storage medium DHM to the connector board CNT, when the display devices are delivered to a plurality of companies, it is possible to cope with the situation by merely changing the connection board whereby parts of the products can be used in common whereby the manufacturing cost can be reduced and the deadline can be largely shortened.

Further, as the data storage medium DHM, a ROM, a flash ROM and any other medium which can record and electrically read information can be used.

Embodiment 13

Figure 14:
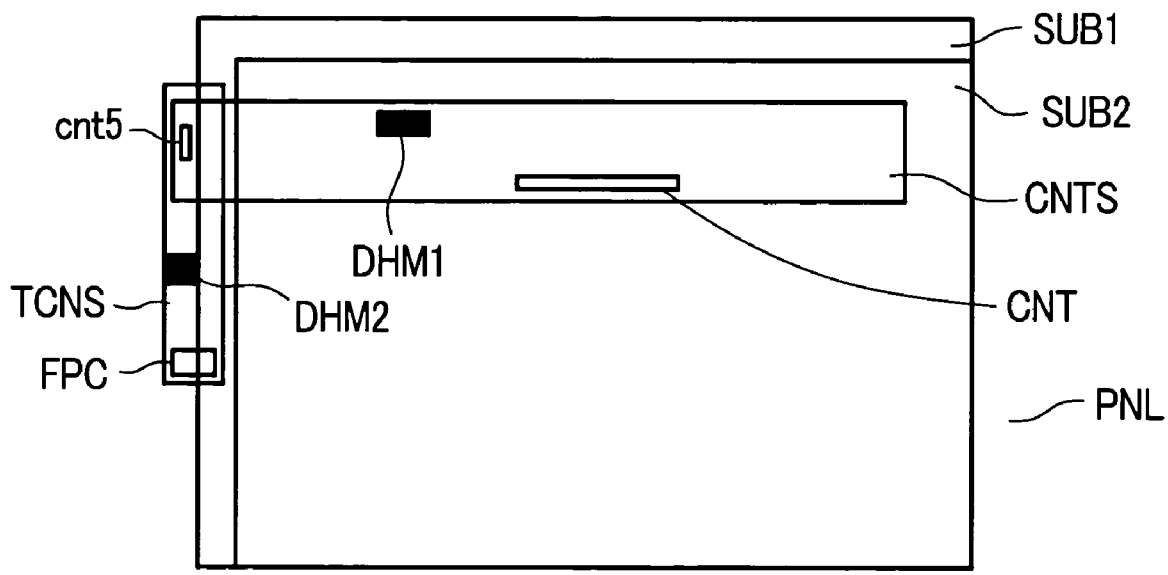
FIG. 14 is a plan view showing another embodiment of the constitution of the connector board and the display control circuit board.

Further, FIG. 14 is a view showing another embodiment of the display device according to the present invention and corresponds to FIG. 13.

The constitution which makes this embodiment different from the embodiment shown in FIG. 13 lies in that a first data storage medium DHM1 is mounted on a connector board CNTS, a second data storage medium DHNS2 is mounted on a display control circuit board TCNS, information which is supplied to the outside of the display device are set in the first data storage medium DHM1 and information which is supplied to the inside of the display device is set in the second data storage medium DHM2.

In this manner, by setting the inside-use information in the second data storage medium DHM2, the reduction of an inspection cost can be realized. Further, by setting the outside-use information in the first data storage medium DHM1, the reduction of cost attributed to the reduction of the number of kinds of products can be realized. That is, by classifying the information into the inside-use information and the outside-use information and setting these information in the above-mentioned separate members, it is possible to realize various advantageous effects such as the large reduction of manufacturing cost, shortening of time for shipping of products, readily response to design change, the reduction of inventory and the like synergistically.

Here, as an example of the storage medium, any type of medium such as a ROM, a flash ROM or the like, for example, which is capable of recording and electrically reading information can be used.

Further, the display device may be provided with a DA converter which can generate gray scale voltages based on the information stored in the data storage medium DHM. It is also needless to say that the DA converter may be incorporated into a video signal drive circuit He or a display control circuit TCON.

Embodiment 14

Figure 15A:
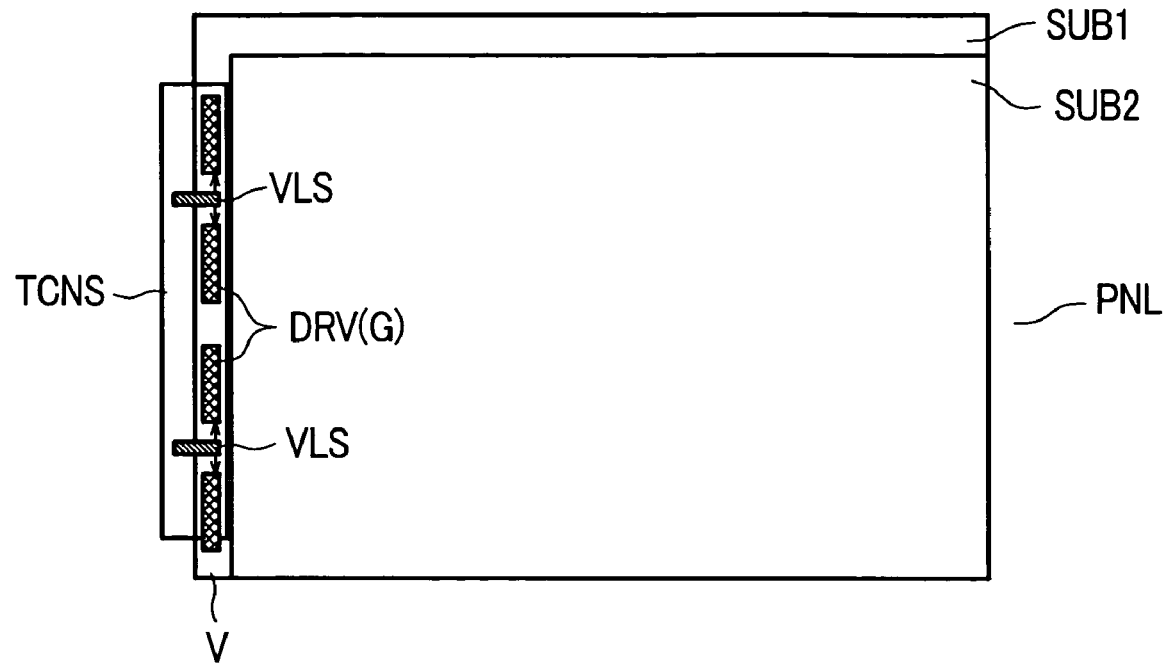
FIGS. 15A and 15B are plan views showing an embodiment of a connection mode between the display panel PNL and the display control circuit board.

FIG. 15(a) is a plan view showing another embodiment of the display device according to the present invention. In the same manner as the above-mentioned embodiment, a display control circuit board TCNS is formed separately from a connector board CNTS and, at the same time, the display control circuit board TCNS is formed on the display panel PNL, for example, at a back surface of a scanning signal drive circuit V.

In this embodiment, power source which is supplied to a plurality of respective semiconductor devices DRV(G) which constitute the scanning signal drive circuit V is supplied from the display control circuit board TCNS.

In this case, from one end side of the respective semiconductor devices DRV(G) which are arranged in parallel, for example, every two semiconductor devices DRV(G) are formed into a group, a power source supply part VLS from the display control circuit board TCNS is positioned in a region defined between respective semiconductor devices DRV(G) of each group, and power source is supplied from the power source supply part VLS to the respective semiconductor devices DRV(G) arranged at both sides of the power source supply part VLS.

Due to such a constitution, it is possible to make the power source supply condition conform to every semiconductor device DRV(G) and hence, the image quality can be enhanced. Further, it is no more necessary to provide the power source supply portions which are made to respectively correspond to the respective semiconductor devices DRV(G) from the display control circuit board TCMS and hence, the number of power source supply parts can be reduced whereby the reduction of manufacturing cost can be realized.

In the above-mentioned embodiment, the number of the semiconductor devices DRV(G) in the group which are allocated to one power source supply portion is set to 2, the number of the semiconductor devices DRV(G) may be three or more. In short, it is sufficient that the number of semiconductor devices corresponding to the power source supply part is equal with respect to respective groups of semiconductor devices.

Figure 15B:
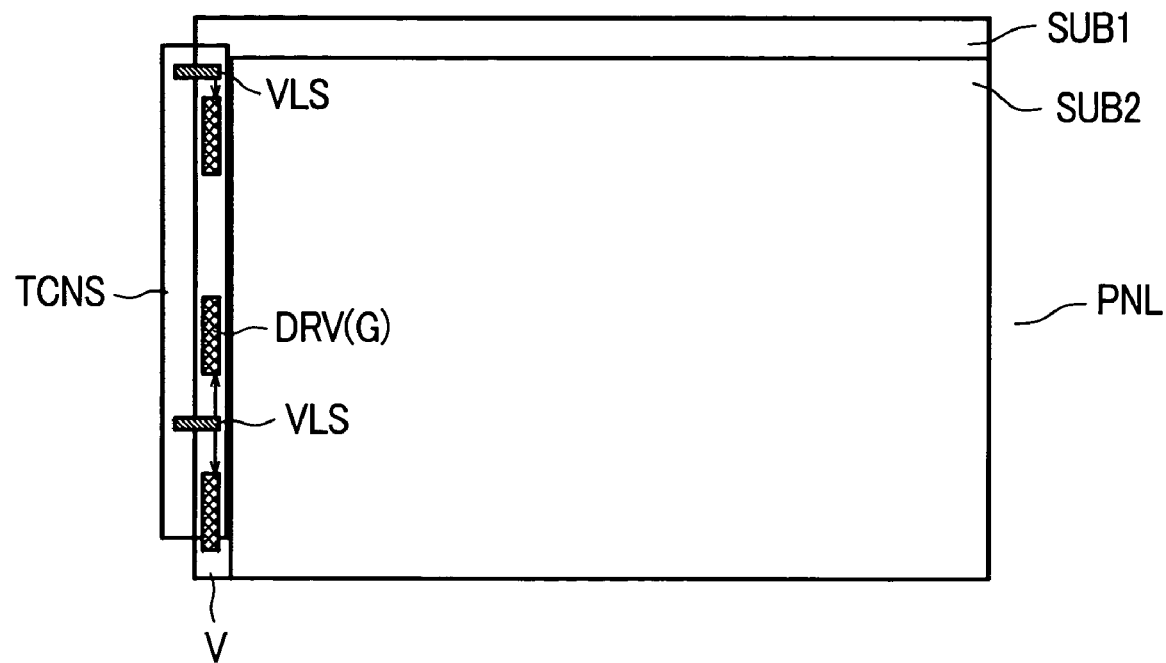

Further, FIG. 15(b) is a plan view showing another embodiment of the display device according to the present invention and corresponds to FIG. 15(a).

The constitution which makes this embodiment different from the embodiment shown in FIG. 15(a) lies in that the scanning signal drive circuit V is constitute of the odd number of semiconductor devices DRV(G), wherein in arranging power source supply portions VLS as in the case shown in FIG. 15(a), one remaining power source supply portion VLS is positioned at one end of the scanning signal drive circuit V. In this embodiment, the power source supply portion VLS is positioned outside the scanning signal drive circuit V, for example.

This one remaining power source supply portion VLS is preferably positioned at a side of a transparent substrate SUB1 on which the scanning signal drive circuit V is formed, wherein the side extends beyond another transparent substrate SUB2 which faces the transparent substrate SUB1 in an opposed manner.

Due to such a constitution, the power source supply portion VLS at the side can be formed together with separate wiring formed on the same flexible board and hence, the number of connecting members for the display control circuit board TCNS and the display panel PNL (transparent substrate SUB1) can be reduced.

Embodiment 15

Figure 16A:
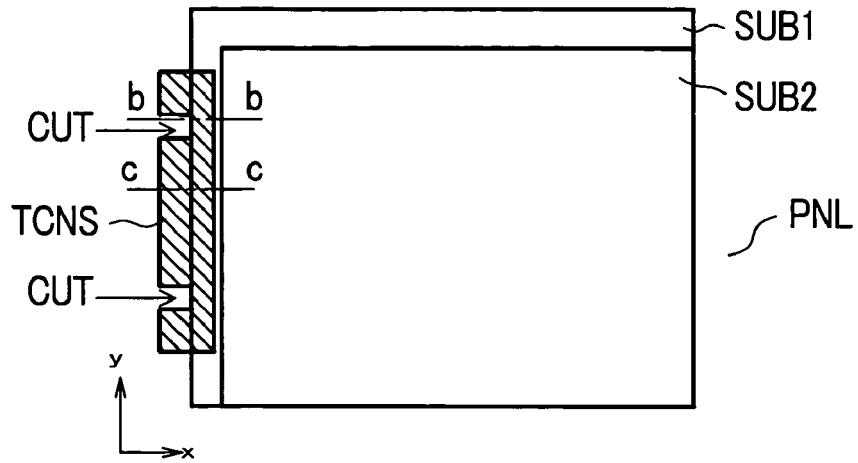
FIGS. 16A, 16B, 16C and 16D are views showing another embodiment of the constitution of the display control circuit board.
Figure 16B:
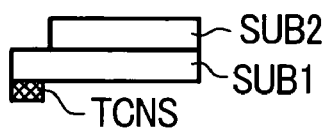
Figure 16C:
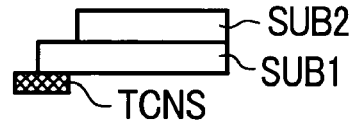

FIG. 16(a) is a plan view showing another embodiment of the display device according to the present invention. In the same manner as the above-mentioned embodiments, a display control circuit board TCNS is configured separately from a connector board CNTS and, at the same time, the display control circuit board TCNS is arranged on a display panel PNL, for example, at a back surface of a scanning signal drive circuit V. Here, FIG. 16(b) is a cross-sectional view taken along a line b-b in FIG. 16(a) and FIG. 16(c) is a cross-sectional view taken along a line c-c in FIG. 16(a).

This embodiment provides the structure which enables mounting of the display control circuit board TCNS on the display panel PNL with high accuracy.

With respect to the display control circuit board TCNS which is arranged on a back surface of the scanning signal drive circuit V of the display panel PNL, a portion or the most of one side (right side in the drawing) of the display control circuit board TCNS with respect to a center line thereof which extends along the longitudinal direction is positioned below the back surface of the display panel PNL and a portion or the most of another side (left side in the drawing) of the display control circuit board TCNS with respect to the center line is arranged to be exposed from the display panel PNL.

Further, notches CUT are formed in a side of a portion of the display control circuit board TCNS which is exposed from the display panel PNL. The notches CUT are cut out in the direction orthogonal to the side and end sides, that is, bottom sides of the notches CUT are aligned with the side of a transparent substrate SUB1 of the display panel PNL.

That is, by arranging the display control circuit board TCNS using the notches CUT formed in the display control circuit board TCNS as marks such that the bottom portions of the notches CUT are aligned with the side of a transparent substrate SUB1 of the display panel PNL, it is possible to always realize the alignment (positioning in the x direction in the drawing) with stability and high accuracy. Further, the highly accurate alignment can be realized even with naked eyes, it is possible to readily cope with a case which requires repairing.

Although the number of the notches CUT which are formed in the display control circuit board TCNS is not limited, by providing two notches CUT in a spaced-apart manner from each other, it is possible to achieve the alignment with high accuracy.

Figure 16D:
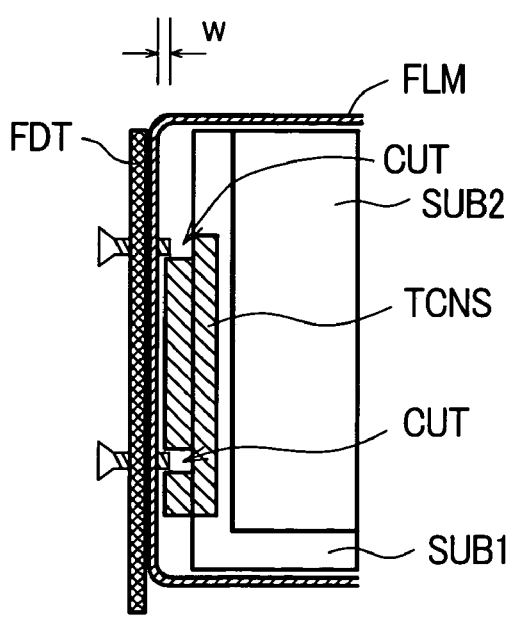
Figures 21A, 21B, 21C, 21D:
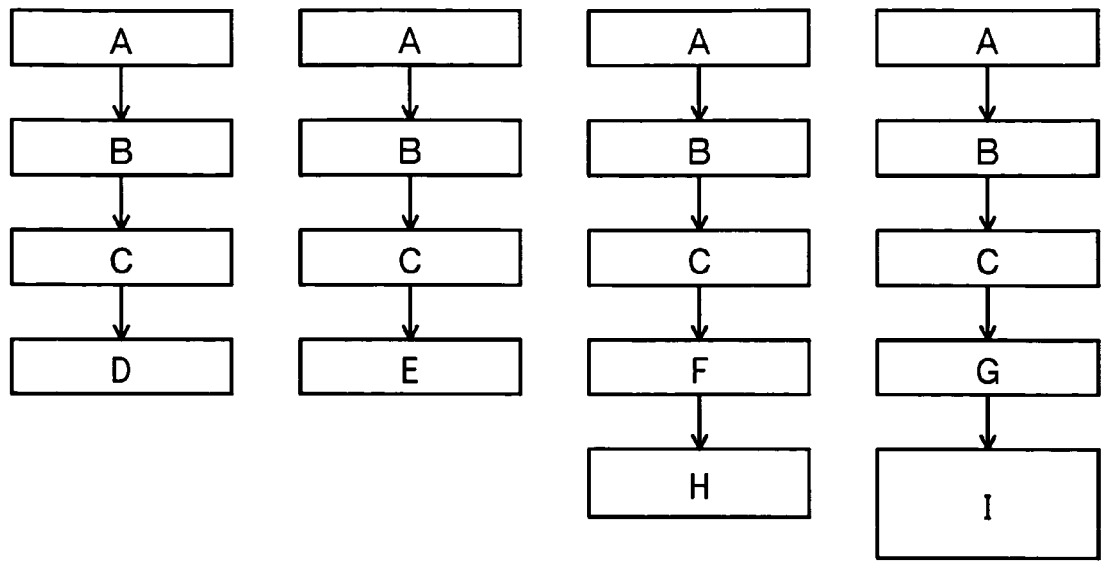
FIGS. 21A, 21B, 21C and 21D are flow charts showing an embodiment of a manufacturing method of the display device according to the present invention.

Further, FIG. 16(d) shows a case in which the display device shown in FIG. 16(a), FIG. 16(b) and FIG. 16(c) is formed into a module using a frame FLM (or a mold). As shown in FIG. 16(d), the frame FLM is configured such that when the frame FLM is fixed to a housing FDT of an equipment such as a notebook type personal computer or the like, for example, using screws, distal ends of the screws which penetrate the frame FLM are positioned in the inside of the notches CUT of the display control circuit board TCNS.

Due to such a constitution, it is possible to have an advantageous effect that a width W between an inner wall surface of the frame FLM and the display control circuit board TCNS which is arranged close to the inner wall surface can be narrowed.

Embodiment 16

FIG. 17(a), FIG. 17(b) and FIG. 17(c) are views which respectively show modes of notches CUT formed in the display control circuit board TCNS in the embodiment 15.

Here, the notch CUT does not require three sides for defining a profile thereof and may be a shape formed of two sides or one side. This is because the notches CUT referred to in this embodiment are provided for having a function of positioning the display control circuit board TCNS with respect to the display panel PNL, it is sufficient for the notches CUT if the notches CUT can perform such a function.

FIG. 17(a) shows an example in which the notch CUT having three sides and the notch CUT having two sides are formed in the display control circuit board TCNS, FIG. 17(b) shows an example in which the notches CUT respectively having two sides are formed in the display control circuit board TCNS, and FIG. 17(c) shows an example in which the notches CUT respectively having one side are formed in the display control circuit board TCNS.

Embodiment 17

FIG. 18(a), FIG. 18(b) and FIG. 18(c) are views which respectively show another embodiment of the display device according to the present invention and also are plan views showing the positional relationship between a transparent substrate SUB1 of a display panel PNL and a display control circuit board TCNS.

For example, in FIG. 18(a), a mark MRK is formed on a surface of the transparent substrate SUB1 and the display control circuit board TCNS which is arranged on a back surface of the transparent substrate SUB1 is arranged such that one end side (side parallel to the x direction in the drawing) of the display control circuit board TCNS is disposed close to the mark MRK.

Due to such a constitution, it is possible to perform the highly accurate positioning or alignment of the display control circuit board TCNS in the y direction in the drawing.

In the case shown in FIG. 18(a), the mark MRK is constituted of a metal layer which is formed by vapor deposition, sputtering or the like and has a line-like pattern which is parallel to one end side of the display control circuit board TCNS. In the case shown in FIG. 18(b), the mark MRK is formed of a triangular pattern which has a peak point aligned with a portion of one end side of the display control circuit board TCNS. In the case shown in FIG. 18(c), the mark MRK has a circular pattern.

Here, when these patterns are formed of a metal layer or the like, by forming the pattern simultaneously with the formation of conductive layers formed on pixel regions in a display part, it is possible to suppress the increase of the number of manufacturing steps.

Embodiment 18

FIG. 19(a) is a view which shows another embodiment of the display device according to the present invention and also is a plan view showing the positional relationship between a transparent substrate SUB1 of a display panel PNL and a display control circuit board TCNS.

As explained in conjunction with the above-mentioned embodiments, the physical and electrical connections between the display control circuit board TCNS and the display panel PNL are established by a flexible printed circuit board FPC.

Further, the above-mentioned mark MRK which is formed on a surface of the display panel PNL (transparent substrate SUB1) is formed on a portion close to the flexible printed circuit board FPC.

While the accuracy is required at a side where the flexible printed circuit board FPC is arranged, by positioning the display control circuit board TCNS using the above-mentioned mark MRK at such a side where the accuracy is required, it is possible to enhance the accuracy.

Further, FIG. 19(b) shows, with respect to the constitution shown in FIG. 19(a), the constitution in which a notch CUT is formed in the display control circuit board TCNS in the vicinity of the flexible printed circuit board FPC thus performing the positioning of the display control circuit board TCNS in the x direction in the drawing.

Due to such a constitution, around the flexible printed circuit board FPC of the display control circuit board TCNS, it is possible to eliminate the displacement of the display control circuit board TCNS in the x direction as well as in the y direction.

Embodiment 19

FIG. 20 is a view showing another embodiment of the display device according to the present invention and also is a view showing the constitution for achieving the highly accurate alignment of positioning of a display panel PNL (transparent substrate SUB1) and a display control circuit board TCNS.

First of all, in the transparent substrate SUB1, on a portion thereof having a back surface where the display control circuit board TCNS is positioned, a mark MRK1 is formed. The mark MRK1 is formed simultaneously with the formation of a wiring layer WL1 or the like, for example, which is formed in other region on the transparent substrate SUB1. Due to such a constitution, the mark MRK1 can be formed at the accurate position with respect to the pattern such as the wiring layer WL1 or the like formed on the transparent substrate SUB1.

On the other hand, also in the display control circuit board TCNS, on a portion thereof which is arranged to face a back surface of the transparent substrate SUB1, a mark MRK2 is formed. The mark MRK2 is also formed simultaneously with the formation of a wiring layer WL2 or the like, for example, which is formed in other region on the surface of the display control circuit board TCNS.

Positioning of the display control circuit board TCNS with respect to the transparent substrate SUB1 is performed by confirming that the mark MARK2 is positioned at a given position with respect to the mark MAR1 by naked eyes which see through the transparent substrate SUB1.

Embodiment 20

In this embodiment, the inspection of a display device is performed such that a display control circuit board TCNS is mounted on a back surface of a display panel PNL as explained in the above-mentioned respective embodiments and, thereafter, the display device is operated by the display control circuit board TCNS.

FIG. 21(a), FIG. 21(b), FIG. 21(c) and FIG. 21(d) are flow charts showing manufacturing steps of different types of display devices. In respective steps, A indicates a step for forming a display panel PNL, B indicates a step for mounting the display control circuit board TCNS, C indicates a step for inspecting lighting, D indicates a step for mounting parts which comes thereafter, E indicates a step for mounting backlight BL, F indicates a step for mounting a lower frame FLM, G indicates a step for mounting an upper frame FFM, H indicates a step for mounting a connector board CNTS, and I indicates a step for mounting a display device on a housing of a monitor, a notebook type personal computer or a television receiver set.

As can be clearly understood from these flow charts, in all manufacturing steps, after mounting the display control circuit board TCNS, the lighting inspection step is performed. That is, the inspection of the display device is performed by operating the display device using the display control circuit board TCNS. In the succeeding steps, mounting of the backlight BL, the frame FLM, the connector board CNTS and the like is performed.

Due to such manufacturing steps, it is possible to drive the display device in response to an input signal in a midst in a course of the assembling of a display module in the same manner as a completion stage and hence, it is possible to carry out the inspection in an early stage of assembling steps. Accordingly, defective products can be removed in an early stage and hence, the wasteful use of other parts can be obviated thus realizing the reduction of manufacturing cost.

Further, in performing the correction after the inspection, it is possible to perform the correction in an early stage of the assembling operation and hence, the wasteful steps can be eliminated thus realizing the reduction of time and cost necessary for correction.

Further, when a connector board CNTS is formed in a later assembling step apart from the display control circuit board TCNS, irrespective of the type of a connector of the connector board CNT, the inspection can be realized. Accordingly, types of the connectors of the inspection device can be standardized and hence, the reduction of the number of inspection devices and the shortening of the inspection time can be realized.

The above-mentioned respective embodiments may be used in a single form respectively or in combination. This is because that the advantageous effects of the respective embodiments can be obtained in a single form or synergistically.

As has been described heretofore, according to the display device of the present invention, it is possible to have the advantageous effects such as the easy exchange of the connector for fetching the external video data.

What is claimed is:

1. A flat panel display device comprising:
   a display panel which is shaped as a rectangular board,
   a frame member different from the display panel, wherein the frame member is mounted on a back surface of the display panel,
   a first board having a wiring mounted with a first connector which inputs video data to be displayed on the display panel and which is arranged on a back side of the display panel, and
   a second board having one end mounted with a display control circuit and having the other end arranged in-between the display panel and the first board in a direction perpendicular to the display panel to transmit the video data from the first connector via the wiring and a second connector to the display control circuit,
   wherein the first board and the second board are physically separated from each other,
   the second board is mounted with the second connector which connects to the first board in a direction perpendicular to the display panel,
   the second board contacts with a region of a back surface of the display panel except for a display portion, and
   the first board contacts with a back surface of the frame member.

2. A flat panel display device according to claim 1, wherein an area of the second board is set smaller than an area on the first board.

3. A flat panel display device according to claim 1, wherein the frame member holds the display panel, and a backlight is put between the frame member and the display panel.

4. A flat panel display device according to claim 1, wherein the frame member has a through hole accommodating said second connector.

5. A flat panel display device according to claim 1, wherein the first connector is arranged on a back surface of the first board.

6. A flat panel display device according to claim 1, wherein the first board is mounted with only the first connector and the second connector connected to the second board.

* * * * *